US012165436B1

(12) United States Patent
Pertsel

(10) Patent No.: US 12,165,436 B1
(45) Date of Patent: Dec. 10, 2024

(54) TOLL COLLECTION AND CARPOOL LANE AUTOMATION USING IN-VEHICLE COMPUTER VISION AND RADAR

(71) Applicant: Ambarella International LP, Santa Clara, CA (US)

(72) Inventor: Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 128 days.

(21) Appl. No.: 17/979,048

(22) Filed: Nov. 2, 2022

(51) Int. Cl.
| | |
|---|---|
| *G06V 20/40* | (2022.01) |
| *G01S 13/06* | (2006.01) |
| *G06T 7/70* | (2017.01) |
| *G06V 20/58* | (2022.01) |
| *G06V 20/59* | (2022.01) |
| *G06V 40/10* | (2022.01) |
| *G07B 15/06* | (2011.01) |
| *G08G 1/0967* | (2006.01) |
| *H04W 4/40* | (2018.01) |
| *H04W 4/80* | (2018.01) |

(52) U.S. Cl.
CPC ............ *G07B 15/063* (2013.01); *G01S 13/06* (2013.01); *G06T 7/70* (2017.01); *G06V 20/46* (2022.01); *G06V 20/58* (2022.01); *G06V 20/593* (2022.01); *G06V 40/103* (2022.01); *G08G 1/096725* (2013.01); *H04W 4/40* (2018.02); *H04W 4/80* (2018.02); *G06T 2207/10016* (2013.01); *G06T 2207/30196* (2013.01); *G06T 2207/30242* (2013.01); *G06T 2207/30268* (2013.01)

(58) Field of Classification Search
CPC . G01S 13/06; G06T 7/70; G06T 2207/30242; G06T 2207/30268; G06V 20/46; G06V 20/593; G06V 40/103
See application file for complete search history.

(56) References Cited

U.S. PATENT DOCUMENTS

| | | | | |
|---|---|---|---|---|
| 8,344,886 B2 * | 1/2013 | Gravelle | ................. | H04Q 9/00 340/505 |
| 9,075,136 B1 * | 7/2015 | Joao | ........................ | B63B 49/00 |
| 9,202,118 B2 * | 12/2015 | Wang | ..................... | G06V 40/16 |
| 9,843,777 B2 * | 12/2017 | Schofield | ................. | B60R 1/04 |
| 9,891,060 B2 * | 2/2018 | Gaither | ............. | G01C 21/3676 |
| 10,929,835 B2 * | 2/2021 | Nyalamadugu | ..... | G06Q 20/3278 |
| 11,257,303 B2 * | 2/2022 | Gravelle | ................ | G07B 15/00 |
| 11,721,212 B2 * | 8/2023 | Chikamori | ......... | G01C 21/3658 701/428 |
| 2015/0379782 A1 * | 12/2015 | Nakagawa | ........... | G07B 15/063 705/13 |

(Continued)

*Primary Examiner* — John A Tweel, Jr.
(74) *Attorney, Agent, or Firm* — Maiorana Patent Law, PA

(57) ABSTRACT

An apparatus comprising an interface and a processor. The interface may be configured to receive data about an interior of a vehicle. The processor may be configured to process the data, determine a number of occupants in the vehicle in response to an analysis of the data and generate a counter signal comprising the number of the occupants in the vehicle. The counter signal may be generated in a format compatible with a toll interface of a toll tag. The toll tag may be implemented in the vehicle. The toll tag may be configured to generate a readable occupant count in response to the counter signal. The readable occupant count may be configured to be scanned by an automatic roadway system.

20 Claims, 12 Drawing Sheets

(56) References Cited

U.S. PATENT DOCUMENTS

2019/0164357 A1\* 5/2019 John ................. G06Q 20/28
2023/0168364 A1\* 6/2023 Podkamien ....... B60R 21/01552
　　　　　　　　　　　　　　　　　　　　701/45

\* cited by examiner

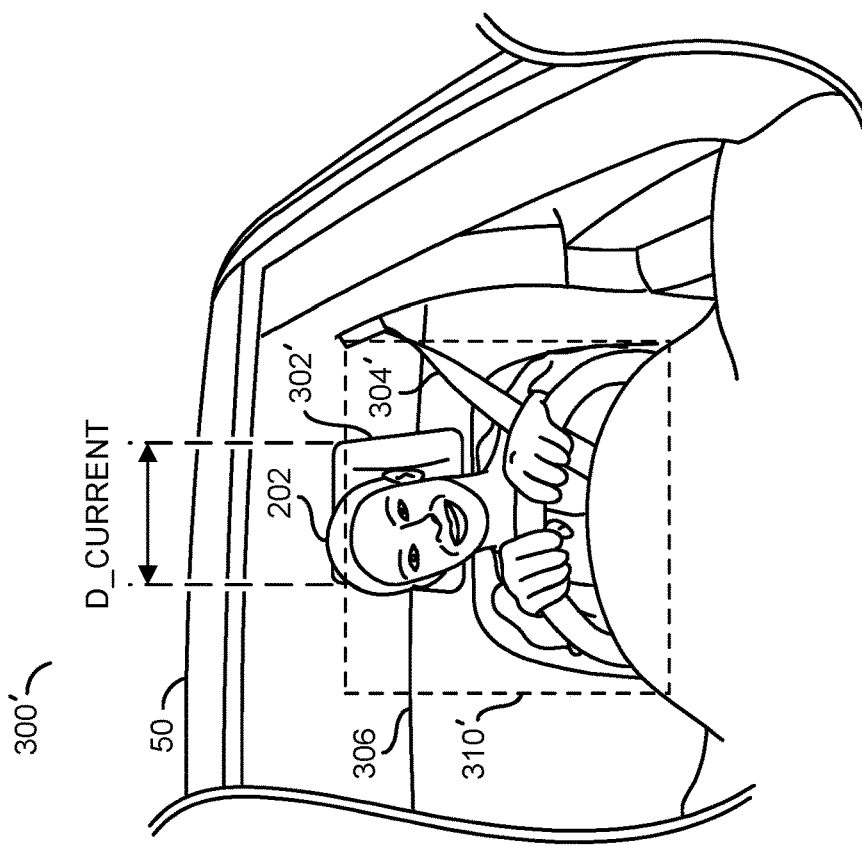
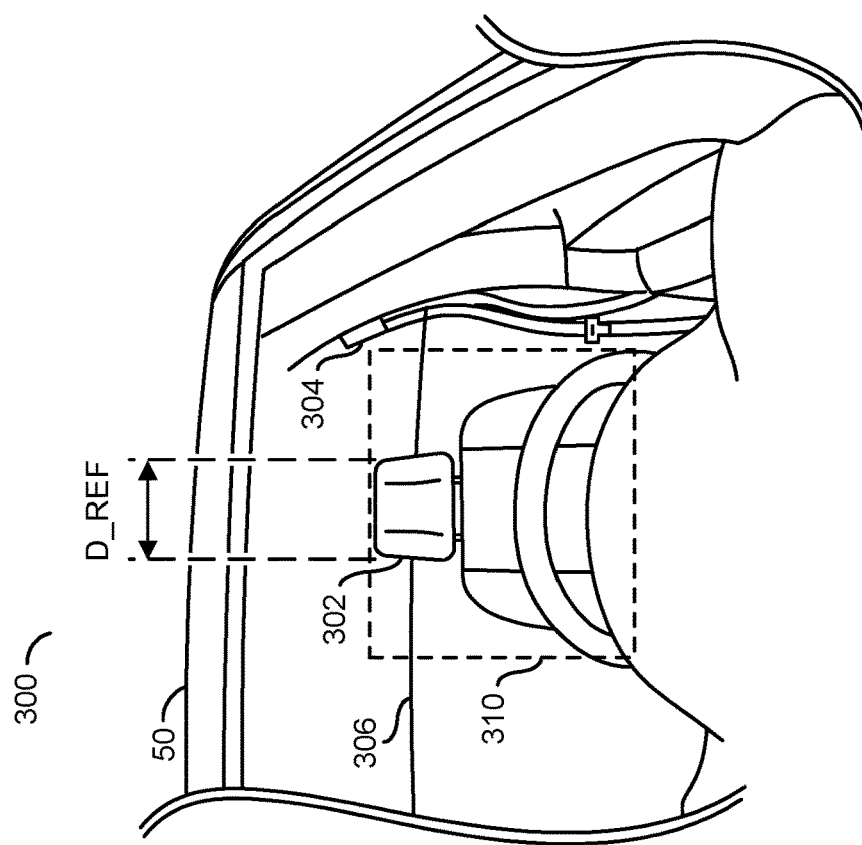
FIG. 4

TOLL COLLECTION AND CARPOOL LANE AUTOMATION USING IN-VEHICLE COMPUTER VISION AND RADAR

FIELD OF THE INVENTION

The invention relates to vehicle occupancy detection generally and, more particularly, to a method and/or apparatus for implementing toll collection and carpool lane automation using in-vehicle computer vision and radar.

BACKGROUND

Many highways and bridges are designed to incentivize driving habits that help reduce total vehicle emissions. For example, priority can be given to clean energy vehicles as well as "high occupancy vehicles". High occupancy vehicles are often considered vehicles that have at least one additional passenger or more than two passengers. Particular lanes can be reserved for high occupancy vehicles depending on the number of passengers in the vehicle. Some roads may provide reduced toll amounts for depending on the number of occupants in the vehicle.

Usage of high occupancy lanes or adjustment to toll amounts are conventionally enforced by highway patrol officers, using automatic beacons (i.e., California FasTrak), or external cameras. Highway patrol officers provide inconsistent enforcement (i.e., officers cannot be everywhere at the same time and highway patrol officers are expensive). Automatic beacons work manually through a switch on the beacon to set the number of occupants. Automatic beacons are inconvenient and in many cases drivers forget to set the correct slider position (i.e., resulting in excessive or insufficient toll). External cameras do not provide reliable results because the cameras are not positioned optimally to detect the number of occupants in a vehicle.

It would be desirable to implement toll collection and carpool lane automation using in-vehicle computer vision and radar.

SUMMARY

The invention concerns an apparatus comprising an interface and a processor. The interface may be configured to receive data about an interior of a vehicle. The processor may be configured to process the data, determine a number of occupants in the vehicle in response to an analysis of the data and generate a counter signal comprising the number of the occupants in the vehicle. The counter signal may be generated in a format compatible with a toll interface of a toll tag. The toll tag may be implemented in the vehicle. The toll tag may be configured to generate a readable occupant count in response to the counter signal. The readable occupant count may be configured to be scanned by an automatic roadway system.

BRIEF DESCRIPTION OF THE FIGURES

Embodiments of the invention will be apparent from the following detailed description and the appended claims and drawings.

FIG. 4 is a diagram illustrating an object comparison between a reference video frame and a captured video frame.

DETAILED DESCRIPTION OF THE EMBODIMENTS

Figure 1:
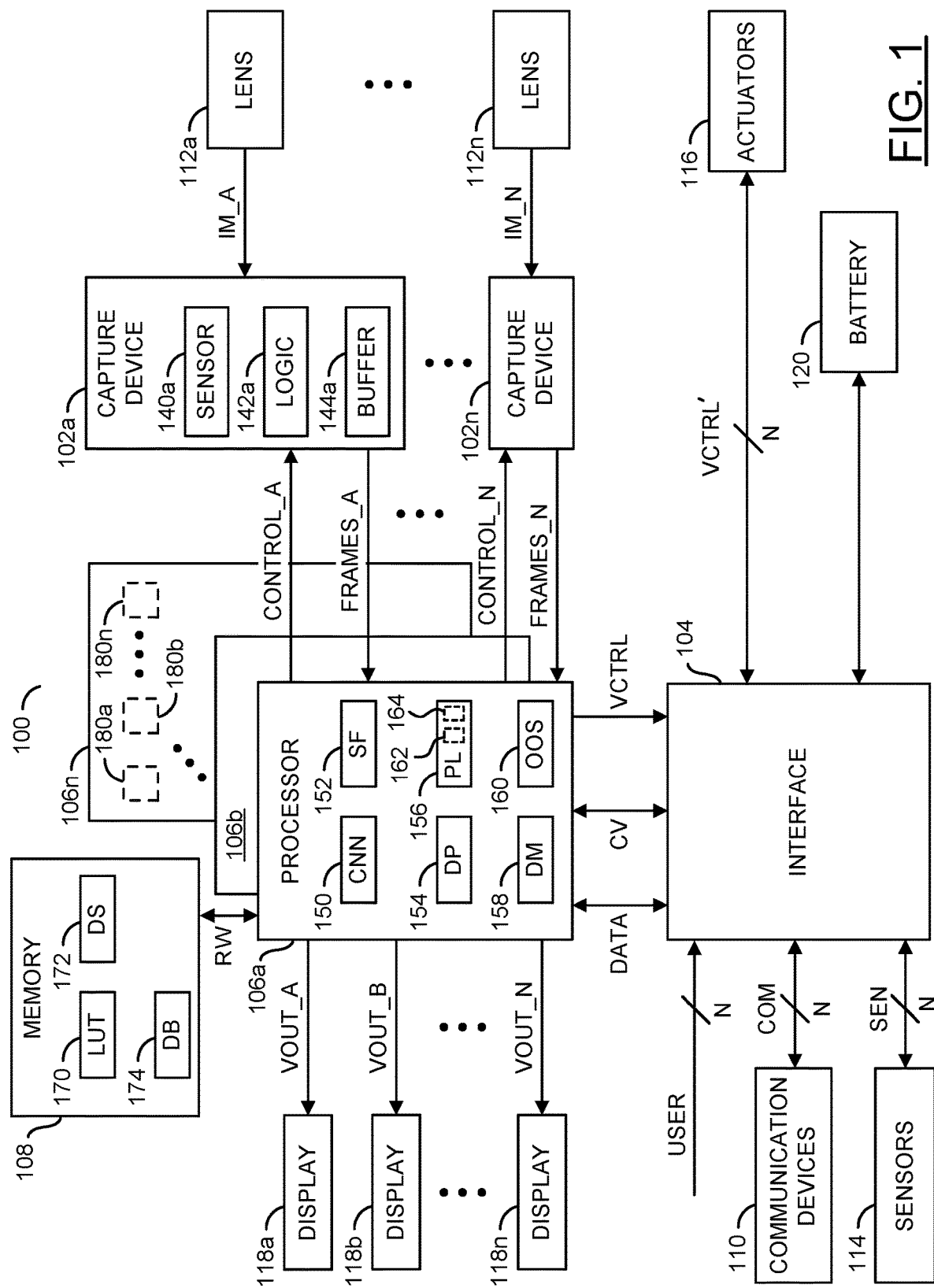
FIG. 1 is a diagram illustrating an embodiment of the present invention.

Embodiments of the present invention include providing toll collection and carpool lane automation using in-vehicle computer vision and radar that may (i) determine a number of occupants within a vehicle, (ii) export the number of occupants in a format compatible with a toll tag, (iii) automatically display a correct count of occupants within a vehicle in a format readable by an automated system, (iv) enable accurate enforcement for high occupancy vehicle lanes, (v) enable accurate collection of roadway tolls, (vi) implement computer vision to detect occupants, (vii) implement in-cabin radar to detect occupants, (viii) provide a camera system with an integrated toll tag, (ix) enable navigation selection based on eligibility for high occupancy vehicle lanes and/or (x) be implemented as one or more integrated circuits.

Embodiments of the present invention may be configured to monitor an interior of a vehicle. The interior of the vehicle may be monitored to determine an accurate count of a number of occupants in a vehicle. In one example, the number of occupants may be determined using an in-cabin camera. The number of occupants may be determined in response to computer vision operations performed on video frames generated by the in-cabin camera. In another example, the number of occupants may be determined using a radar system. The number of occupants may be determined in response to analyzing radar data generated by an in-cabin radar system (e.g., a 60 GHz radar, which may be the frequency assigned to in-cabin monitoring). In yet another example, the number of occupants may be determined in response to a combination of computer vision operations and analyzing radar data (e.g., performing sensor fusion using data from video frames together with radar data). The type of analysis performed and/or the type of data collected in order to determine the number of occupants in a vehicle may be varied according to the design criteria of a particular implementation.

The number of occupants may be determined and presented to a toll tag. A toll tag may be a device configured to display and/or transmit a number of occupants in the vehicle. For example, the toll tag may implement an automatic beacon. The toll tag may be readable by an automated roadway system.

The automated roadway system may be configured to receive an accurate count of the number of occupants in the vehicle by reading the toll tag. In one example, the automated roadway system may use the number of occupants read from the toll tag in order to determine whether a vehicle is eligible to drive in particular designated lanes (e.g., a high occupancy vehicle lane). In another example, the automated roadway system may use the number of occupants read from the toll tag in order to automatically charge a toll to an account assigned to the toll tag (e.g., a fee for a toll road). For example, a toll road may charge a vehicle based on the number of occupants in the vehicle. In yet another example, the automated roadway system may charge a vehicle a toll if the vehicle is determined to be ineligible for driving in a high occupancy vehicle lane (e.g., a driver may not be strictly prohibited from using a high occupancy vehicle lane, but may choose to incur a penalty if the lane is used without the appropriate number of occupants in the vehicle). In one example, the toll tag may be read by the roadway system used to implement the California FasTrak. The use of the number of occupants in a vehicle by the roadway system may vary according to a jurisdiction that the roadway system is used in and/or according to the design criteria of a particular implementation.

In some embodiments, vehicles may be designed and assembled with a built-in (e.g., integrated) cabin monitoring camera. In one example, an Original Equipment Manufacturer (OEM) may integrate a toll tag interface to enable the cabin monitoring camera to communicate with the toll tag. In another example, the OEM may expose the number of occupants determined by the cabin monitoring camera using a standard protocol (e.g., the toll tag and the camera may communicate over a CAN bus, an OBD-II port, Bluetooth communication, USB, etc.). Similarly, a radar system integrated into the vehicle may be configured to communicate with the toll tag.

In some embodiments, the cabin monitoring camera and/or the radar system may be installed in the vehicle as an aftermarket addition. Similar to the integrated camera, the aftermarket cabin monitoring camera and/or radar system may be configured to implement the toll tag interface and/or use one of the standard protocols. In another example, the after market cabin monitor camera (or radar system) may integrate the toll tag. For example, the toll tag may be implemented on a housing of the cabin monitoring camera and/or the radar system.

In some embodiments, the number of occupants may be used in combination with navigation routing for the vehicle. In an example, the number of occupants may be used to determine an eligibility of the vehicle for carpool lanes, which may be taken into account for navigation routing. In one example, the automated roadway system may read the number of occupants from the toll tag, and then communicate a list of available lanes that the vehicle is eligible for based on the number of occupants. For example, the automated roadway system may be configured to dynamically adjust lane eligibility based on time of year, a current amount of traffic, the weather, bylaw changes, etc. By communicating with the automated system, the navigation system may not need to be continually updated to account for the dynamic adjustments to lane eligibility using third-party sources.

In some embodiments, the vehicle may implement exterior facing cameras in addition to the in-cabin camera. Computer vision operations may be performed on the video frames generated by the exterior facing cameras in order to determine per-lane traffic information. The navigation system may be configured to use the per-lane traffic information in combination with the eligibility for various multiple occupant vehicle lanes. For example, a particular road may be faster if a carpool lane may be used, but may be slower if the carpool lane cannot be used. In another example, some interchanges may have different routing depending on the carpool lane eligibility (e.g., a carpool lane may need to turn left while regular lanes may need to turn right). In yet another example, a vehicle that implements autonomous and/or semi-autonomous modes of driving may use the number of occupants to determine whether to select a carpool lane.

Generally, navigation systems provide a setting that enables the routing to use toll roadways (e.g., bridges, tunnels, roads, etc.). The number of occupants may be provided to the navigation system in a format that enables the navigation system to use toll roadways based on the number of occupants. In one example, some tolls may be waived if the vehicle has at least a particular number of passengers. For example, the navigation system may select a toll road when the fee is waived for the vehicle occupancy, even if the user has previously selected not to take toll roads.

Referring to FIG. 1, a diagram illustrating an embodiment of the present invention is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retrofit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, the lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural networks (ANNs) configured to provide artificial intelligence and/or computer vision operations. In an example, the one or more ANNs may comprise a convolutional neural network (CNN) module and/or a generative adversarial network (GAN) trained to provide images processing, object detection, object recognition, object classification, etc. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The processors 106a-106n may comprise an interface configured to receive pixel data, video frames, audio data, sensor data, data from external sources, etc. In an example, the interface of the processors 106a-106n may be configured to enable Gigabit Ethernet, a USB 2.0 host and device, multiple (e.g., three) SD card controllers with SDXC support and/or MIPI-DSI/CSI output. The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a passive infrared (PIR) sensor, a thermometer, a gyroscope, a compass, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. For example, the processors 106a-106n may be configured to receive triple-sensor video input with high-speed SLVS/MIPI-CSI/LVCMOS interfaces. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The ANNs 150 may be configured to implement various artificial intelligence models. In the example shown, the ANNs 150 may be described as a convolutional neural network module. For simplicity, the ANNs 150 may be described as the CNN module 150. However, other types of artificial intelligence models may be implemented.

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of objects to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding (e.g., 4KP30 AVC and HEVC encoding with multi-stream support) and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The video pipeline module 156 may enable multi-stream support (e.g., generate multiple bitstreams in parallel, each comprising a different bitrate). In an example, the video pipeline module 156 may implement an image signal processor (ISP) with a 320 M Pixels/s input pixel rate. The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine 164 may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc. In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. In one example, the hardware modules 180a-180n may be configured to implement various security features (e.g., secure boot, I/O virtualization, etc.). The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
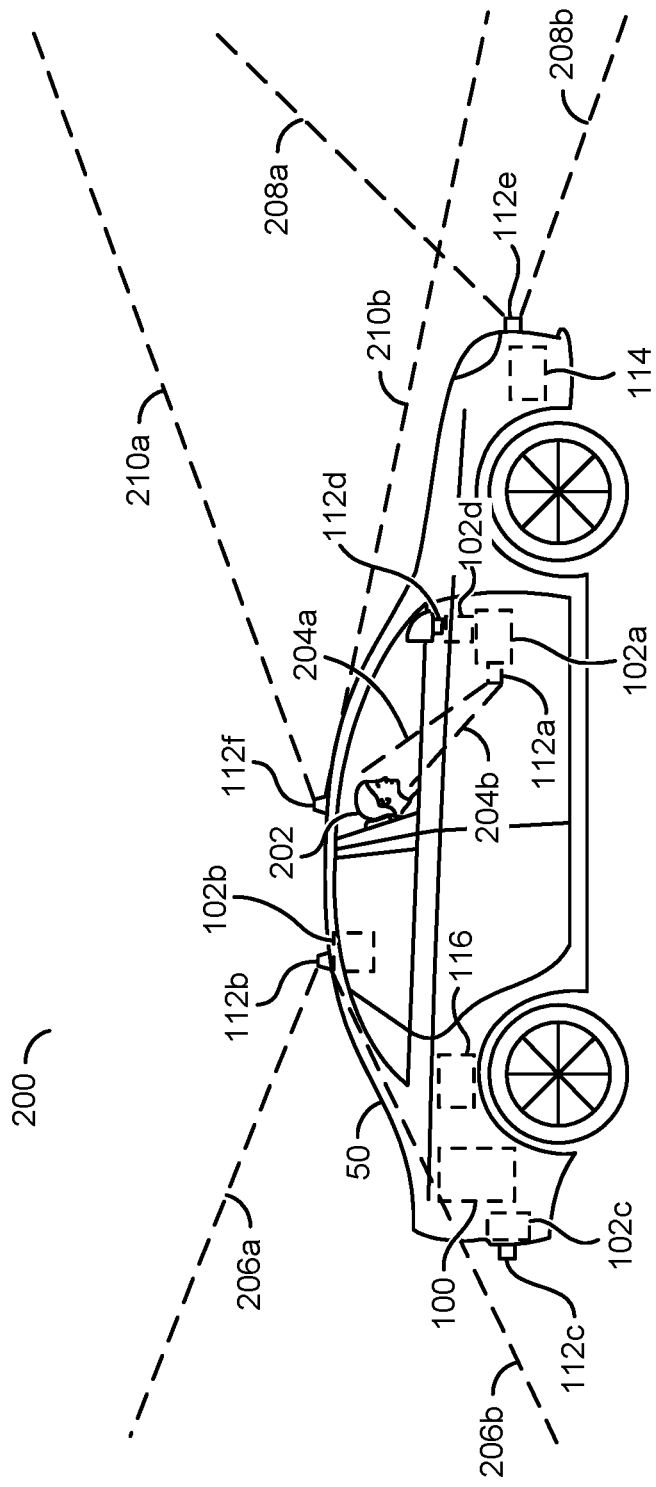
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment).

The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiments, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, RGB-IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
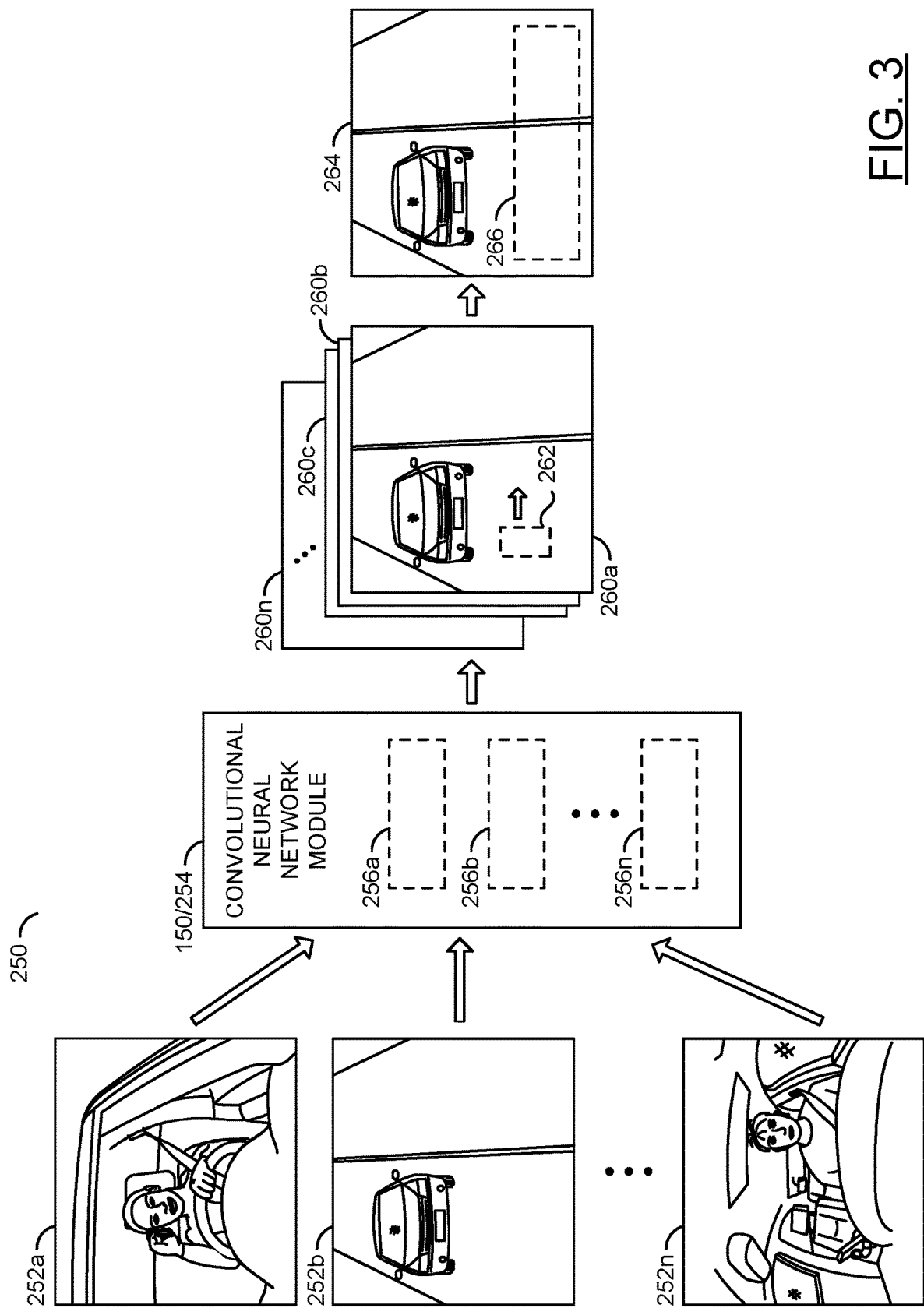
FIG. 3 is a diagram illustrating an example visualization of training a convolutional neural network for object detection using fleet learning.

Referring to FIG. 3, a diagram illustrating an example visualization of training a convolutional neural network for object detection using fleet learning is shown. A training and/or object detection visualization is shown. Images and/or video frames 252a-252n are shown. The images and/or video frames 252a-252n may be training data. The training data 252a-252n may comprise reference images captured from disparate sources. The disparate sources may comprise the video frames FRAMES_A-FRAMES_N processed by the video pipeline module 156 from pixel data and/or video data captured from other sources (e.g., images previously captured by the camera system 100, images received from a database of images (e.g., stock images), images captured by a fleet uploaded to a database of images, etc.). In an example, embodiments of the apparatus 100 may be implemented in a fleet of vehicles (e.g., the ego vehicle 50 and other vehicles may each implement an embodiment of the camera system 100). Each embodiment of the camera system 100 may independently generate video data that may be used as the training data 252a-252n.

To detect objects using computer vision, the convolutional neural network 150 may be trained using the training data 252a-252n. The training data 252a-252n may comprise a large amount of information (e.g., input video frames). For example, multiple vehicles each implementing the camera system 100 may be capable of generating more video data than the camera system 100 installed on the ego vehicle 50 alone. By combining the training data 252a-252n generated from multiple disparate sources (e.g., each implementation of the camera system 100), a greater amount of the training data 252a-252n may be generated and/or a greater variety of the training data 252a-252n may be generated (e.g., video from different types of vehicles, video from different environments, video from different states and/or countries, etc.).

The training data 252a-252n may be labeled. The labels for the training data 252a-252n may be provided as metadata of the video frames. Labeling the training data 252a-252n may enable the CNN module 150 to have a ground truth basis for determining which objects are present in the training data 252a-252n.

A block (or circuit) 254 is shown. The circuit 254 may implement a computing device, a processor and/or a server computer. The circuit 254 may implement a centralized convolutional neural network. The centralized convolutional neural network 254 may comprise blocks (or circuits) 256a-256n. The circuits 256a-256n may implement artificial intelligence models. The centralized convolutional neural network 254 may comprise other components (e.g., a processor, a memory, various dedicated hardware modules, a communication device, etc.). The number, type and/or arrangement of the components of the circuit 254 may be varied according to the design criteria of a particular implementation.

The circuit 254 may be configured to receive the training data 252a-252n. For example, each implementation of the camera system 100 (e.g., installed on multiple different vehicles) may be configured to present the training data 252a-252n to the circuit 254. The labels implemented in the metadata of the training data 252a-252n may comprise information about the video content in the video frame. In an example, if the training data 252a comprises an image of a vehicle, the label may indicate that the video frame comprises a vehicle and/or the particular make/model/year of the vehicle. In another example, if the training data 252b comprises an image of a person, the label may indicate an identity of the person (e.g., for facial recognition), characteristics of the person (e.g., age, gender, height, color of clothing, etc.) and/or behavior of the person (e.g., walking, not moving, reaching, sleeping, etc.). The labels of the training data 252a-252n may provide a ground truth sample. In an example, if the artificial intelligence model 256b is configured to detect a driver (or driver behavior), the training data 252a-252n may provide a ground truth sample of a person performing a particular behavior (e.g., driving). The types of information provided by the labels and/or the format of the labels may be varied according to the design criteria of a particular implementation.

The circuit 254 may be configured to train the artificial intelligence models 256a-256n. The circuit 254 may comprise similar functionality as the CNN module 150. The circuit 254 may have access to greater computing resources (e.g., power, processing capabilities, memory, etc.) than the processors 106a-106n. In an example, the circuit 254 may be implemented as part of a cloud computing service, configured to scale resources based on demand. The additional computing capabilities of the circuit 254 may be capable of handling the large amount of the training data 252a-252n received from the disparate sources.

The AI models 256a-256n may be configured to implement and/or generate a machine readable DAG to detect various objects and/or events. A feature set may be loaded as part of the AI models 256a-256n for analyzing the video frames. The AI models 256a-256n may be continually enhanced in response to the training data 252a-252n. For example, the training data 252a-252n may be used to refine the feature set used to detect objects (e.g., to adjust neural network weight values and/or bias values for the AI models 256a-256n).

The AI models 256a-256n may be generated by the circuit 254 in response to computer vision analysis of the training data 252a-252n. One or more of the AI models 256a-256n may be communicated to the camera system 100. The AI models 256a-256n may be used by the CNN module 150. In an example, the CNN module 150 may implement an AI model, the circuit 254 may receive the training data 252a-252n to refine the AI models 256a-256n, and the CNN module 150 may be updated based on the AI models 256a-256n. Updating the CNN module 150 with one or more of the AI models 256a-256n may enable the CNN module 150 to continually improve the results of the computer vision operations.

The CNN module 150 and the circuit 254 may operate similarly. In some embodiments, the CNN module 150 may receive the training data 252a-252n and update the AI models 256a-256n (e.g., locally). In some embodiments, the circuit 254 may receive the training data 252a-252n and update the AI models 256a-256n for the CNN module 150. For example, the circuit 254 may provide a centralized source for updating the CNN module 150 implemented by multiple implementations of the camera system 100 (e.g., a fleet update). The fleet of vehicles may generate the training data 252a-252n, the circuit 254 may process the training data 252a-252n to update the AI models 256a-256n, and the fleet of vehicles may receive the AI models 256a-256n as an update to the CNN module 150 in order to benefit from the training data 252a-252n generated by the fleet of vehicles. The computer vision operations and/or training performed by the CNN module 150 and the computer vision operations and/or the training performed by the circuit 254 may be implemented similarly. For example, descriptions of operations performed by the circuit 254 may be assumed to apply to the CNN module 150 interchangeably. Similarly, the computer vision operations performed on the training data 252a-252n may be similar to the computer vision operations performed on the video frames FRAMES_A-FRAMES_N generated by the processors 106a-106n.

The artificial intelligence models 256a-256n may be configured to be trained to detect particular objects. Each of the artificial intelligence models 256a-256n may be trained to recognize, classify and/or distinguish one or more types of objects. The number of artificial intelligence models 256a-256n implemented by the CNN module 150 and/or the circuit 254 may be varied according to the design criteria of a particular implementation.

The CNN module 150 may operate in a training mode of operation. In an example, the AI models 256a-256n may be directed acyclic graphs. In the training mode of operation, the AI models 256a-256n may analyze many examples of objects. In one example, if the AI model 256a is configured to detect vehicles, the AI model 256a analyze many examples of vehicle images. Training the AI models 256a-256n may determine and/or calculate parameters, weighting values and/or biases for the directed acyclic graph. The trained AI models 256a-256n may be a DAG with parameters, weighting values and/or biases pre-programmed and/or pre-defined (e.g., based on self-directed learning) for detecting particular types of objects. In some embodiments, the trained AI models 256a-256n may be a quantized neural network (e.g., a reduced size neural network configured to operate on an edge device that has been modified based on a full size neural network that was trained offline (e.g., on the circuit 254)).

While the apparatus 100 is in operation, the CNN module 150 may continually learn using new video frames as the input training data 252a-252n. However, the processors 106a-106n may be pre-trained (e.g., configured to perform computer vision before being installed in the vehicle 50). For example, the results of training data 252a-252n (e.g., the machine learning models 256a-256n) may be pre-programmed and/or loaded into the processors 106a-106n. The processors 106a-106n may conduct inferences against the machine learning models 256a-256n (e.g., to perform object detection). In some embodiments, the signal CV generated by the processors 106a-106n may be sent to the interface 104 to enable the communication devices 110 to upload computer vision information (e.g., to the centralized server 254 and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In the example shown, the training data 252a-252n may capture video data of various vehicle occupants (e.g., captured from one of the capture devices 104a-104n that provides in-cabin monitoring of the ego vehicle 50). For example, the training data 252a-252n may be a sequence of video frames captured prior to the processors 106a-106n determining that a change in orientation of various body parts of an occupant has been detected (e.g., caused by an occupant reaching out, an occupant leaning forward, an occupant moving hands and/or arms, etc.). The training data 252a-252n may be labeled based on whether the prediction was incorrect or correct. Using the training data 252a-252n (e.g., video frames captured from many different vehicles as the vehicles are produced, as different vehicles are deployed on the roads, etc.), many training data sets may be available to train the AI models 256a-256n. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 252a-252n may be uploaded to the central CNN module 254 to perform and/or train the AI models 256a-256n for the computer vision. The results (e.g., the AI models 256a-256n) of the training from the central CNN module 254 may be installed on each of the CNN modules 150 of each apparatus 100 (or transmitted while the apparatus 100 is in operation to remotely provide updates via the communication devices 110).

The CNN module 150 and/or the circuit 254 may receive the training data 252a-252n in a training mode of operation. The CNN module 150 may analyze captured video frames (e.g., the signal FRAMES_A-FRAMES_N) to detect object, classify objects and/or extract data about objects using the trained AI models 256a-256n. To perform the training and/or the computer vision operations, the CNN module 150 may generate a number of layers 260a-260n. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window 262 may slide horizontally one pixel to comprise a box of pixels B0 through E0 and B3 through E3 (e.g., the pixels from B0 through D0 and B3 through D3 are used in both the first and second operation). The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

Using the input video frames as the training data 252a-252n, the CNN module 150 and/or the AI models 256a-256n may be trained. The training may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the CNN module 150 and/or the AI models 256a-256n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest.

The input image is typically generated by warping an original image taken by an on-dash mounted camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, the machine learning may be performed by the centralized CNN module 254 that has access to greater computing resources than the camera system 100. Generally, the processing capabilities and/or computing resources available to the centralized CNN module 254 (e.g., implemented as part of a cloud computing network) may be greater than the processing capabilities and/or computing resources available to the CNN module 150 implemented by the processors 106a-106n. For example, the centralized CNN module 254 may perform the machine learning using the training data 252a-252n, develop the machine learning models 256a-256n, and then provide the machine learning model 254 to each apparatus 100 in a fleet of vehicles.

Even after the AI models 256a-256n have been trained and/or the CNN module 150 has been deployed, the processors 106a-106n and/or the centralized CNN module 254 may continue to receive the training data 252a-252n from each apparatus 100, refine the machine learning models 256a-256n, and then provide updates to the machine learning model for each apparatus 100 (received using the communication device 110). The centralized CNN module 254 may develop, refine and/or enhance the machine learning models 256a-256n by receiving input (e.g., the training data 252a-252n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning models 256a-256n adapted to the constraints of the edge device. The processors 106a-106n may be configured to compress the machine learning models 256a-256n (e.g., compressed compared to the machine learning models 256a-256n implemented by the centralized CNN module 254). In an example, compressing the machine learning models 256a-256n may comprise quantization, pruning, sparsification, etc. Compressing the machine learning model may enable the CNN module 150 to perform the machine learning and/or conduct inferences against the machine learning models 256a-256n (e.g., object detection). By performing the machine learning at the edge (e.g., locally on the processors 106a-106n), there may be reduced latency compared to performing wireless communication with the centralized CNN module 254. Similarly, the apparatus 100 may be able to perform the machine learning without maintaining a wireless connection. By performing the machine learning at the edge, privacy may be maintained since the training data 252a-252n would be kept local. Performing the machine learning at the edge (e.g., locally), the processors 106a-106n may preserve privacy and avoid heavy video processing running on back-end servers. Whether the machine learning is performed locally (e.g., at the edge), performed using a centralized resource and/or performed using a combination of local and centralized resources may be varied according to the design criteria of a particular implementation.

The machine learning performed by the CNN module 150 and/or the circuit 254 may comprise supervised training. For example, the CNN module 150 may be self-trained using the training data 252a-252n. Supervised learning may enable the CNN module 150 to automatically adjust the weighting values and/or biases in response to metadata contained within the training data 252a-252n (e.g., a designer and/or engineer may not need to program the weighting values for the AI models 256a-256n). The metadata contained within the training data 252a-252n may provide ground truth data. Backpropogation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more likely to determine the presence of a vehicle. Similarly, where the training data 252a-252n is labeled as not providing an image of a vehicle, the CNN module 150 may extract the features from the image and apply the extracted features to the weighting values to make future computer vision operations more likely to determine the presence of a vehicle (e.g., particular weighting values may be decreased to de-emphasize particular features that may not be associated with a vehicle). The CNN module 150 may implement a deep convolutional neural net to enable features to be learned through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., the reference video frame 300 may be an example of the training data 252a-252n as described in association with FIG. 3). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat in additional rows of seats (e.g., middle seats, a back bench seat, etc.), the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 and a reference object 306 is shown. In the example shown, the reference object 304 may be a driver seat belt and the reference object 306 may be a rear seat. The CNN module 150 may determine a location of the seat belt 304 and/or the rear seat 306 (e.g., a location based on a horizontal and/or vertical pixel count). In some embodiments, sensors 114 may provide an indication of the status of the seat belt 304 (e.g., clicked into place, unused, etc.).

The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver). The rear seat 306 may be an example of a static object (e.g., an object that does not move). The rear seat 306 may be used as a static reference to indicate relative movements and/or locations of other objects.

In the example reference video frame 300, a reference object 310 is shown. In the example shown, the reference object 310 may be an unoccupied seat. For example, the CNN module 150 may recognize color, shape, distance, stitching, design, etc. of the reference object 310. The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 150 may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' the detected object 306 and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). Since the rear seat 306 is static, the rear seat 306 may be the same in both the reference video frame 300 and the current video frame 300'. In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, a rear seat row, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
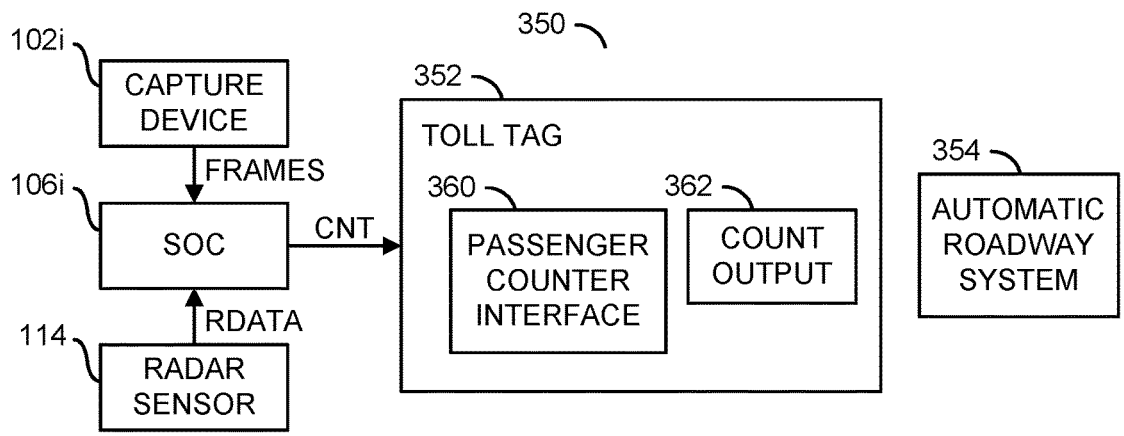
FIG. 5 is a block diagram illustrating an example embodiment of communicating a vehicle occupant count to a discrete toll tag device from a detection system built into a vehicle.

Referring to FIG. 5, a block diagram illustrating an example embodiment of communicating a vehicle occupant count to a discrete toll tag device from a detection system built into a vehicle is shown. An automatic toll collection and/or carpool lane automation system 350 is shown. The automatic toll collection and/or carpool lane automation system 350 may comprise the apparatus 100. A portion of the apparatus 100 is shown. The capture device 102i is shown as a representative example of the capture devices 102a-102n, the SoC 106i is shown as a representative example of the processors 106a-106n and the radar sensor 114 is shown implementing one of the sensors 114. In an example, the capture device 102i may be the capture device 102a with the lens 112a directed at the driver 202 (e.g., the in-cabin camera) shown in association with FIG. 2. In some embodiments, the apparatus 100 may perform computer vision operations in response to the pixel data received from the capture device 102i without implementing an in-cabin radar. In some embodiments, the apparatus 100 may perform radar analysis on radar data received from the radar sensor 114 without performing computer vision operations on occupants of the vehicle 50. In some embodiments, the apparatus 100 may perform a combination of the computer vision operations in response to the pixel data received from the capture devices 102a-102n and perform radar analysis on the radar data received from the radar sensor 114 in order to make inferences about the number of occupants of the vehicle 50 that would not be available from one source alone. The combinations of data used to analyze the interior of the vehicle 50 may be varied according to the design criteria of a particular implementation.

The automatic toll collection and/or carpool lane automation system 350 may further comprise a block (or circuit) 352 and/or a block (or circuit) 354. The circuit 352 may implement a toll tag device. The circuit 354 may implement an automatic roadway system. The automatic toll collection and/or carpool lane automation system 350 may comprise other components (not shown). The number, type, arrangement and/or interconnections of the automatic toll collection and/or carpool lane automation system 350 may be varied according to the design criteria of a particular implementation.

The toll tag device 352 may be implemented on or in the vehicle 50. In one example, the toll tag device 352 may be located within the cabin of the vehicle 50. For example, the toll tag device 352 may be placed on the dashboard of the vehicle 50 such that the toll tag device 352 is visible through a windshield of the vehicle 50. In another example, the toll tag device 352 may be affixed to an outside of the windshield of the vehicle 50. In yet another example, the toll tag device 352 may be affixed to an inside of the windshield. In still another example, the toll tag device 352 may be located on a license plate of the vehicle 50. Generally, the toll tag device 352 may be implemented on or in the vehicle 50 such that the toll tag device 352 may be readable by the automatic roadway system 354. The location of the toll tag device 352 may be varied according to the implementation of the automatic roadway system 354 and/or the design criteria of a particular implementation.

The toll tag device 352 may be configured to communicate with the automatic roadway system 354. The toll tag device 352 may be configured to present a vehicle occupant count to the automatic roadway system 354. The apparatus 100 may be configured to present an accurate count of a number of occupants in the vehicle 50 (e.g., the driver 202 plus any human passengers detected in the vehicle 50). In some embodiments, the toll tag device 352 may display the number of occupants, which may be read by the automatic roadway system 354. In some embodiments, the toll tag device 352 may communicate wirelessly with the automatic roadway system 354 to present the number of occupants. In some embodiments, the toll tag device 352 may be configured to receive a communication from the automatic roadway system 354 (e.g., receive an invoice number for an automatic toll amount, receive a list of approved lanes that may be available based on the number of occupants in the vehicle, receive an acknowledgment of the number of occupants detected, etc.).

The automatic roadway system 354 may be configured to communicate with and/or read from various transponders (e.g., the toll tag device 352). The automatic roadway system 354 may comprise a number of camera devices and/or wireless communication beacons (e.g., Wi-Fi, Bluetooth, RFID, etc.). The automatic roadway system 354 may be implemented throughout a city, a state and/or a highway/freeway system. The automatic roadway system 354 may be an interconnected system that may be configured to manage toll collection and/or eligibility for carpool lanes. In one example, the automatic roadway system 354 may be the California FasTrak system (e.g., implemented statewide on all of the toll roads, toll bridges, and high-occupancy toll lanes along the California Freeway and Expressway System). For example, the automatic roadway system 354 may be implemented according to the Intelligent Transportation Systems initiative of the U.S. Department of Transportation. The implementation of the automatic roadway system 354 may be varied according to the design criteria of a particular implementation.

In some embodiments, the automatic roadway system 354 may be configured as a read-only system. For example, the automatic roadway system 354 may be configured to read a number of occupants of the vehicle 50 from the toll tag device 352 and automatically charge a toll to an account holder associated with the toll tag device 352. In some embodiments, the automatic roadway system 354 may be configured to implement two-way communication. For example, the automatic roadway system 354 may be configured to read a number of occupants of the vehicle 50 from the toll tag device 352, automatically charge a toll to an account holder associated with the toll tag device 352 and communicate back to the toll tag device 352. In one example, the automatic roadway system 354 may be configured to send an acknowledge message to the toll tag device 352 to indicate that a payment has been charged. In another example, the automatic roadway system 354 may be configured to send a list of eligible lanes that may be used by the vehicle 50 based on the number of occupants in the vehicle 50. In yet another example, the automatic roadway system 354 may be configured to send traffic updates and/or construction updates to the toll tag device 352. The type of information communicated to and from the automatic roadway system 354 may be varied according to the design criteria of a particular implementation.

The automatic roadway system 354 may be configured to provide accurate collection of roadway tolls (e.g., fees for driving on particular roads). The automatic roadway system 354 may be configured to enable an accurate enforcement of the usage of high occupancy vehicle lanes (e.g., ensuring only uses that meet an occupancy threshold drive in lanes reserved for high occupancy vehicles). The automatic roadway system 354 may comprise and/or be connected to a database. The database may comprise user accounts for charging fees. The user accounts may further store payment information (e.g., credit card information for automatic e-payments). The database may be configured to store a list of roads and/or lanes that may be toll lanes/roads, high occupancy lanes/roads, lanes/roads that may be currently undergoing construction, etc. For example, the database may be updated in real-time as new roads/lanes become available, fees are updated and/or as occupancy thresholds are adjusted. In some embodiments, the database and/or the automatic roadway system 354 may be controlled and/or operated by a department of transportation of a particular state and/or jurisdiction.

The toll tag device 352 may comprise a block (or circuit) 360 and/or a block (or circuit) 362. The circuit 360 may implement a passenger counter interface. The circuit 362 may implement a count output device. The toll tag device 352 may comprise other components (not shown). The number, type and/or arrangement of the components of the toll tag device 352 may be varied according to the design criteria of a particular implementation.

The passenger counter interface 360 may be configured to enable an electronic communication between the SoC 106i and the toll tag device 352. The SoC 106i may generate a signal (e.g., CNT). The signal CNT may comprise data indicating the number of occupants detected in the vehicle 50. The signal CNT may be generated in a format that may be readable by the passenger counter interface 360. The passenger counter interface 360 may be configured to receive the signal CNT, read the number of occupants of the vehicle 50 based on the formatted data in the signal CNT and present the number of occupants to the count output device 362.

In the example shown, the apparatus 100 may be implemented as a device integrated into the vehicle 50. For example, the interface 104 of the apparatus 100 may be configured to communicate over various communication networks within the vehicle 50. In one example, the signal CNT may be generated by the SoC 106i, then presented by the interface 104 over a CAN bus of the vehicle 50 and the passenger counter interface 360 may be configured to read data in a CAN bus format from the CAN bus of the vehicle 50. In another example, the signal CNT may be generated by the SoC 106i, then presented by the interface 104 to an OBD-II port of the vehicle 50 and the passenger counter interface 360 may be configured to read data in an OBD-II format from the OBD-II port of the vehicle 50. In yet another example, signal CNT may be generated by the SoC 106i, then presented by the interface 104 to the communication devices 110 of the vehicle 50 and the passenger counter interface 360 may be configured to wirelessly communicate with the communication devices 110 to read the signal CNT. The communication between the SoC 106i and the passenger counter interface 360 and/or the format of the data indicating the number occupants in the vehicle 50 may be varied according to the design criteria of a particular implementation.

The count output device 362 may be configured to output the number of occupants in a format readable by the automatic roadway system 354. For example, the count output device 362 may be configured to display a value that corresponds to the number of occupants read from the passenger counter interface 360. In one example, the count output device 362 may display a numerical value that may be read by a camera implemented by the automatic roadway system 354 (e.g., using OCR). In another example, the count output device 362 may be configured to electronically generate a QR code, a barcode and/or another type of decodable image format that may be scanned by the automatic roadway system 354. In some embodiments, the count output device 362 may be configured to wirelessly communicate the number of occupants to the automatic roadway system. In one example, the count output device 362 may be an RFID device that may be scanned by the automatic roadway system 354. In another example, the count output device 362 may be configured to implement a Bluetooth and/or Wi-Fi connection to the automatic roadway system 354 in order to communicate the number of occupants of the vehicle 50. The type of communication between the count output device 362 and the automatic roadway system 354 may be varied according to the design criteria of a particular implementation.

In some embodiments, the count output device 362 may be configured to receive data from the automatic roadway system 354. In an example where the automatic roadway system 354 is configured to send data to the toll tag device 352, the count output device 362 may be configured to receive the data. In an example, the Bluetooth and/or Wi-Fi communication implemented by the count output device 362 may be configured to send and receive data. For example, the count output device 362 may be configured to receive roadway data comprising eligible lanes for the vehicle 50 based on the number of occupants in the vehicle 50.

The capture device 102i may be configured to present the signal FRAMES (e.g., one of the signals FRAMES_A-FRAMES_N shown in association with FIG. 1) to the SoC 106i. The signal FRAMES may comprise the pixel data captured by the capture device 102i. The SoC 106i may be configured to read the signal FRAMES, process the pixel data arranged as video frames, perform computer vision operations to detect objects in the video frames, and extract characteristics about the objects detected. In response to the objects detected, the SoC 106i may distinguish between various types of objects within the vehicle 50 (e.g., humans, pets, groceries, sporting equipment, toys, baby seats, car seats, people outside the vehicle, people inside the vehicle, etc.). The SoC 106i may be configured to perform liveness detection to detect a potential fake occupant (e.g., intentionally using mannequin or other a doll to fake a real passenger). The SoC 106i may determine the number of the occupants in the vehicle in response to an analysis of the characteristics about the objects detected. The number of occupants determined may be presented to the passenger counter interface 360 as the signal CNT.

The radar sensor 114 may be configured to present a signal (e.g., RDATA) to the SoC 106*i*. The signal RDATA may comprise the radar data captured by the radar sensor 114 about the interior of the vehicle 50. In one example, the radar sensor 114 may be a 60 GHz radar device. For example, the radar sensor 114 may operate at a frequency assigned to in-cabin monitoring. The SoC 106*i* may be configured to read the signal RDATA, process the radar data, perform radar analysis to detect objects in the radar data and extract characteristics about the objects detected. In response to the radar data, the SoC 106*i* may distinguish between various types of objects within the vehicle 50. The SoC 106*i* may determine the number of occupants in the vehicle in response to an analysis of the characteristics about the objects detected in the signal RDATA. The number of occupants determined may be presented to the passenger counter interface 360 as the signal CNT. In some embodiments, the sensor fusion module 152 may be configured to aggregate the characteristics of the objects detected in the signal RDATA with the characteristics of the objects detected based on the computer vision operations.

Figure 6:
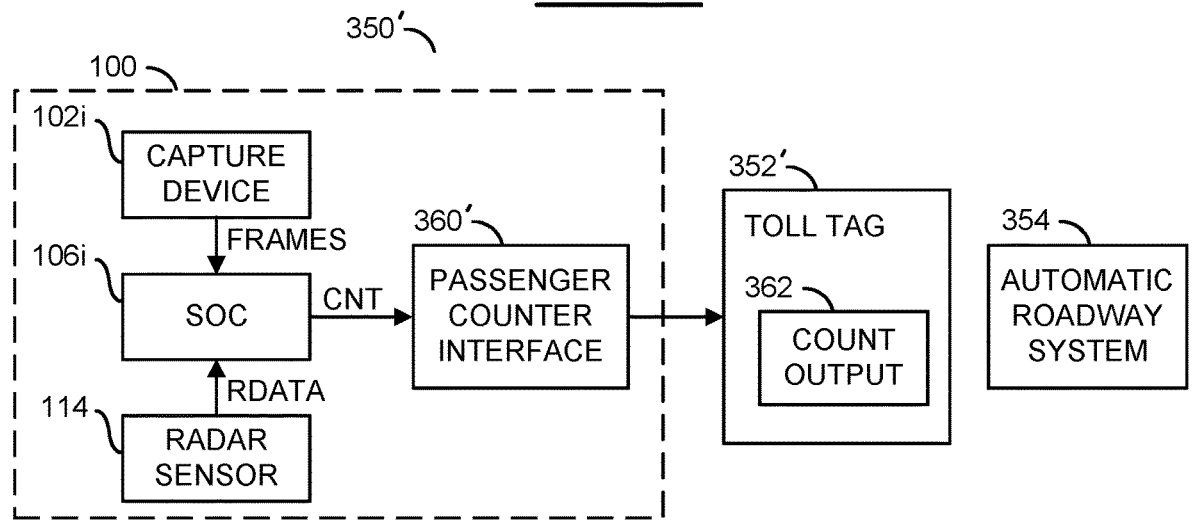
FIG. 6 is a block diagram illustrating an example embodiment of communicating a vehicle occupant count to a discrete toll tag device from an aftermarket detection system added to a vehicle.

Referring to FIG. 6, a block diagram illustrating an example embodiment of communicating a vehicle occupant count to a discrete toll tag device from an aftermarket detection system added to a vehicle is shown. An alternate embodiment of the automatic toll collection and/or carpool lane automation system 350' is shown. The automatic toll collection and/or carpool lane automation system 350' may comprise the apparatus 100, the toll tag device 352' and/or the automatic roadway system 354. The automatic roadway system 354 may have a similar implementation as described in association with FIG. 5.

In the example shown, the apparatus 100 may be implemented as an aftermarket detection system. In one example, the apparatus 100 may be installed in the vehicle 50 that does not implement any in-cabin video capture devices and/or an in-cabin radar system. In another example, the apparatus 100 may be installed in the vehicle 50 in addition to integrated camera systems and/or radar systems that may be implemented by the vehicle 50. In yet another example, the owner of the vehicle 50 may install the apparatus 100 for the purpose of interoperability with the toll tag device 352'.

The apparatus 100 may comprise the capture device 102*i* and/or the radar sensor 114. In one example, the apparatus 100 may be implemented as an aftermarket in-cabin camera implementing the capture device 102*i*. In another example, the apparatus 100 may be implemented as an aftermarket radar system implementing the radar sensor 114. In yet another example, the apparatus 100 may be implemented as an aftermarket combination camera and radar system implementing both of the capture device 102*i* and the radar sensor 114. The apparatus 100 may further comprise the SoC 106*i*. The capture device 102*i*, the SoC 106*i* and/or the radar sensor 114 may have a similar implementation as described in association with FIG. 5.

The apparatus 100 may further comprise the passenger counter interface 360'. The passenger counter interface 360' may be implemented as part of the apparatus 100 instead of as part of the toll tag device 352'. The passenger counter interface 360' may have similar functionality as the passenger counter interface 360 described in association with FIG. 5. The passenger counter interface 360' may be an integrated interface of the apparatus 100. The passenger counter interface 360' may be configured to receive the signal CNT from the SoC 106*i* and present the number of occupants to the toll tag device 352'.

The passenger counter interface 360' may be configured to package the number of occupants in the signal CNT in a format readable by the toll tag device 352'. In some embodiments, the passenger counter interface 360' may enable the apparatus 100 to directly connect to the toll tag device 352' (e.g., via a wired connection). In some embodiments, the passenger counter interface 360' may communicate wirelessly (e.g., using a near-range communication standard such as Bluetooth) with the toll tag device 352'. In some embodiments, the passenger counter interface 360' may be configured to communicate the number of passengers to a communication network of the vehicle 50 (e.g., a CAN bus, an OBD-II port, etc.) and the toll tag device 352' may be configured to read the number of occupants from the same communication network. The medium and/or format of the communication between the passenger counter interface 360' implemented by the apparatus 100 and the toll tag device 352' may be varied according to the design criteria of a particular implementation.

The toll tag device 352' may comprise the count output device 362. The toll tag device 352' may be configured to communicate with the automatic roadway system 354 similar to the toll tag device 352 described in association with FIG. 5. The toll tag device 352' may be implemented without the passenger counter interface 360.

Figure 7:
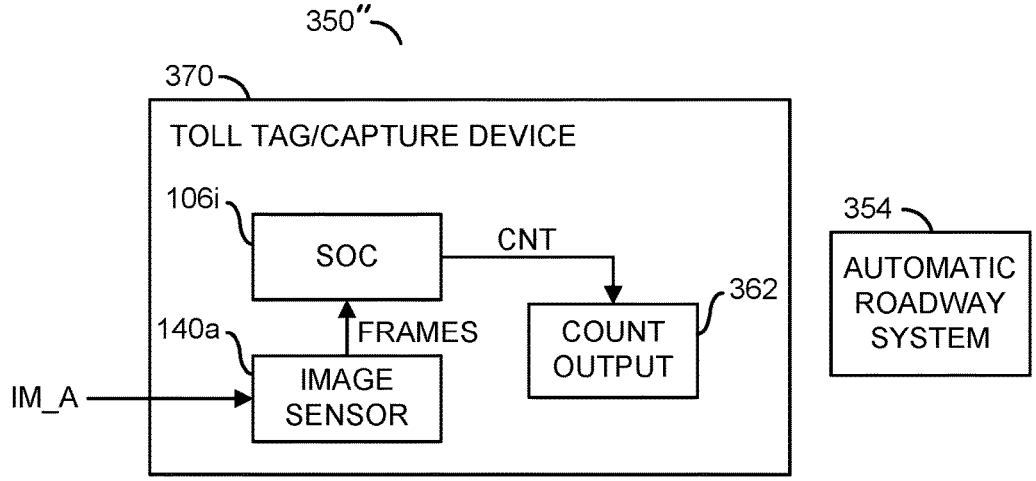
FIG. 7 is a block diagram illustrating a toll tag device built into a camera system.

Referring to FIG. 7, a block diagram illustrating a toll tag device built into a camera system is shown. An alternate embodiment of the automatic toll collection and/or carpool lane automation system 350" is shown. The automatic toll collection and/or carpool lane automation system 350" may comprise a toll tag and capture device combination device 370 and/or the automatic roadway system 354. The automatic roadway system 354 may have a similar implementation as described in association with FIG. 5.

In the example shown, the combination device 370 may be shown as a video capture device configured to generate pixel data arranged as video frames and determine the number of occupants of the vehicle 50 using computer vision operations. Similarly, the combination device 370 may be implemented as a toll tag and radar sensor combination device configured to generate radar data and determine the number of occupants of the vehicle 50 using radar analysis. The combination device 370 may further be implemented as a toll tag, video capture device and radar sensor combination device configured to determine the number of occupants of the vehicle 50 using both computer vision operations and radar analysis. The implementation of the combination device 370 may be varied according to the design criteria of a particular implementation.

The combination device 370 may comprise the image sensor 140*a*, the SoC 106*i* and/or the count output device 362. For simplicity, only a select portion of the apparatus 100 is shown in the combination device 370. However, the combination device 370 may comprise some or all of the components of the apparatus 100. The image sensor 140*a* may be configured to receive the light input IM_A to generate pixel data of the environment within the cabin of the vehicle 50. The image sensor 140*a* (or the capture device 102*i*) may generate the signal FRAMES comprising video data and/or pixel data. The SoC 106*i* may be configured to process the pixel data arranged as video frames to determine the number of occupants of the vehicle 50. The SoC 106*i* may present the signal CNT to the count output device 362. In an example, since the SoC 106*i* and/or the interface 104 may communicate with the count output device 362 the passenger counter interface 360 may not be necessary as an intermediary. The count output device 362 may present the number of occupants to the automatic roadway system 354.

The count output device 362 may be implemented on a housing of the combination device 370. The combination device 370 may be configured to both determine the number of occupants of the vehicle 50 and communicate with the automatic roadway system 354. For example, the combination device 370 may be implemented as a dashcam (e.g., installed near a rearview mirror, on a dashboard, integrated into the dashboard, etc.) configured to capture video of the cabin of the vehicle 50 and also provide the count output device 362 in a location that may be read and/or scanned by the automatic roadway system 354. For example, installing the dashcam near the rearview mirror on the windshield may enable the count output device 362 on the housing of the dashcam to be facing out and visible through the windshield.

In embodiments where the combination device 370 implements the radar sensor 114, the radar sensor 114 may capture radar data and present the signal RDATA to the SoC 106$i$ (e.g., similar to the image sensor 140$a$ capturing the light input IM_A). In some embodiments, the combination device 370 may implement one or more of the capture devices 102$a$-102$n$ that is implemented with a monocular RGB-IR sensor and a structured light projector configured to generate depth maps and/or determine liveness. Details of implementing the structured light projector to generate depth maps may be described in association with U.S. patent application Ser. No. 17/721,392, filed on Apr. 15, 2022, appropriate portions of which are incorporated by reference. In some embodiments, the combination device 370 may implement at least two of the capture devices 102$a$-102$n$ that are implemented as a stereo pair of cameras configured to determine depth information. In some embodiments, the combination device 370 may be configured to perform time of flight operations to determine depth. The type of sensors implemented by the combination system 370 to enable determining the number of occupants in the vehicle 50 may be varied according to the design criteria of a particular implementation.

Figure 8:
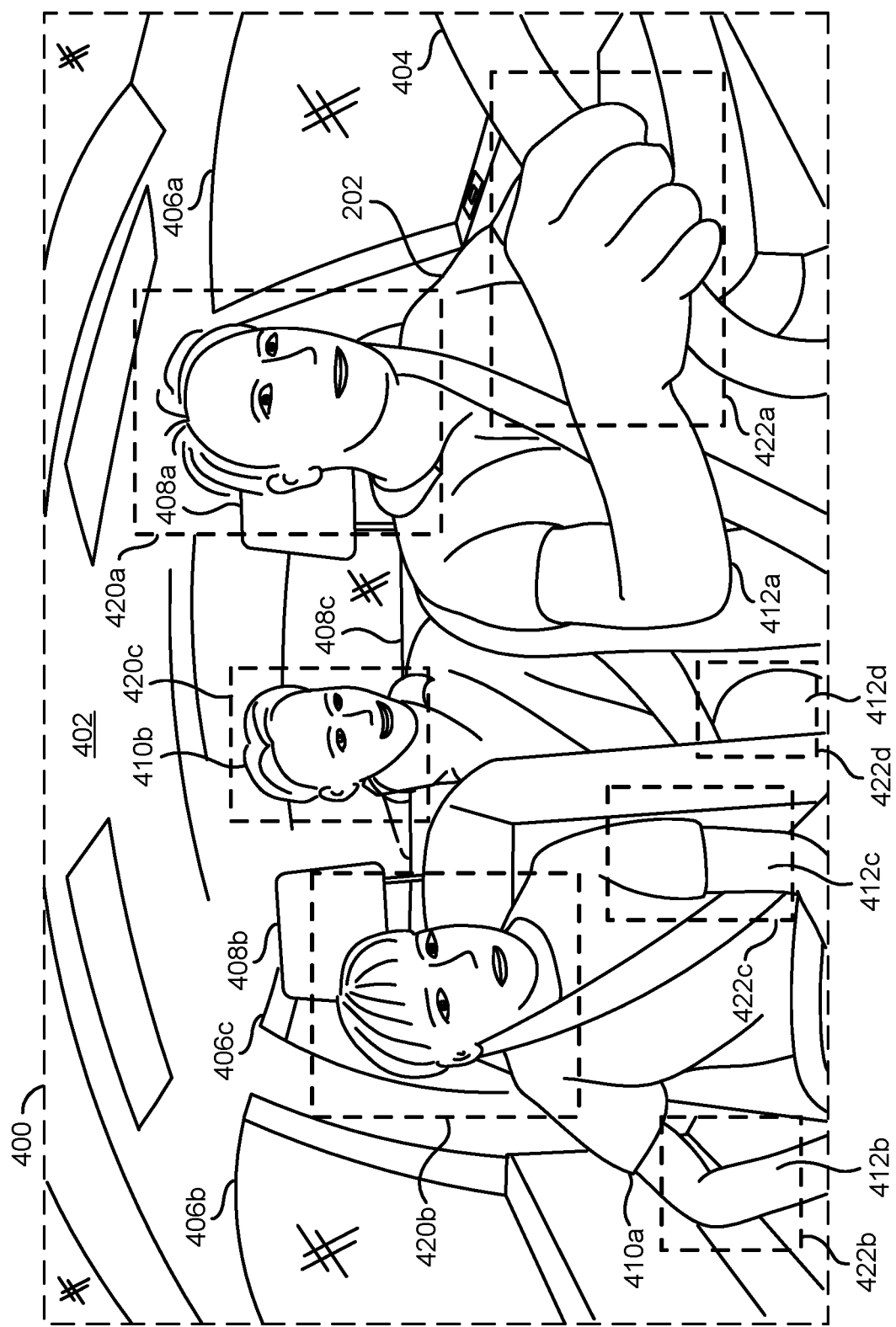
FIG. 8 is a diagram illustrating an example of a processor analyzing characteristics of passengers in a vehicle cabin.

Referring to FIG. 8, a diagram illustrating the processors 106$a$-106$n$ analyzing characteristics of passengers in a video frame of a vehicle cabin is shown. An example video frame 400 is shown. The example video frame 400 may be one of the video frames generated by the processors 106$a$-106$n$. The example video frame 400 may show an interior 402 of the vehicle 50. In one example, the example video frame 400 may be a portion (e.g., a subset) of a full video frame captured by one of the capture devices 102$a$-102$n$. The processors 106$a$-106$n$ may be configured to generate video data from the pixel data in the signals FRAMES_A-FRAMES_N that have a sufficiently high resolution that portions of the video frame may have enough detail for computer vision operations to be performed. In an example, digital zooming, dewarping, oversampling and/or cropping may be performed on a full video frame to generate a video frame portion. In another example, the computer vision operations may be performed on a targeted subset of the full video frame. For example, if the full video frame is a 4K resolution video frame, the video frame portion may have sufficient detail for the CNN module 150 to detect objects. The method of generating the video frame 400 (or a portion of the video frame) may be varied according to the design criteria of a particular implementation.

The example video frame 400 may provide an image of the interior 402 of the vehicle 50. The example video frame 400 may comprise an example of in-cabin monitoring performed by the camera system 100. The processors 106$a$-106$n$ may be designed with the dedicated hardware modules 180$a$-180$n$ configured to efficiently generate high resolution video frames in real-time and perform the computer vision operations in real-time. The driver 202 is shown within the interior 402. A steering wheel 404, doors/windows 406$a$-406$c$, and seats 408$a$-408$c$ are shown as part of the interior 402. The driver 202 is shown in the seat 408$a$. Passengers 410$a$-410$b$ are shown. The passenger 410$a$ is shown in the seat 408$b$ (e.g., a front passenger seat) and the passenger 410$b$ is shown in the seat 408$c$ (e.g., a rear seat). Body parts 412$a$-412$d$ of the occupants (e.g., the driver 202 and the passengers 410$a$-410$b$) are shown. The arm 412$a$ of the driver 202 is shown holding the steering wheel 404. A right arm 412$b$ and a left arm 412$c$ of the passenger 410$b$ are shown. The knee 412$d$ of the passenger 410$b$ is shown.

Dotted boxes 420$a$-420$c$ and dotted boxes 422$a$-422$d$ are shown. The dotted boxes 420$a$-420$c$ and the dotted boxes 422$a$-422$d$ may represent the computer vision operations performed by the processors 106$a$-106$n$ to detect the body parts and/or behaviors of the occupants of the vehicle 50. The CNN module 150 may be configured to detect features and/or descriptors in the example video frame 400 and compare the features and/or descriptors against the features and/or descriptors learned from the training data 252$a$-252$n$ in order to recognize the pixels of the video frame 400 that correspond to the body parts of the occupants. The processors 106$a$-106$n$ may be configured to detect body parts and/or behaviors for each occupant in the interior 402. The behaviors may be determined individually for each of the occupants. The behaviors may be further determined collectively (e.g., detecting the occupants all leaving the vehicle 50, detecting that an attack has occurred, detecting distress, etc.).

The dotted boxes 420$a$-420$c$ and the dotted boxes 422$a$-422$d$ may comprise the pixel data corresponding to an object detected by the computer vision operations pipeline 162 and/or the CNN module 150. The dotted boxes 420$a$-420$c$ and the dotted boxes 422$a$-422$d$ are shown for illustrative purposes. In an example, the dotted boxes 420$a$-420$c$ and the dotted boxes 422$a$-422$d$ may be a visual representation of the object detection (e.g., the dotted boxes 420$a$-420$c$ and the dotted boxes 422$a$-422$d$ may not appear on an output video frame displayed on one of the displays 118$a$-118$n$). In another example, the dotted boxes 420$a$-420$c$ and the dotted boxes 422$a$-422$d$ may be a bounding box generated by the processors 106$a$-106$n$ displayed on the video frame to indicate that an object has been detected (e.g., the bounding boxes 420$a$-420$c$ and the bounding boxes 422$a$-422$d$ may be displayed in a debug mode of operation). The number and/or types of objects detected by the processors 106$a$-106$n$ may be varied according to the design criteria of a particular implementation.

The bounding boxes 420$a$-420$c$ may correspond to the respective head/face of the occupants of the vehicle 50. The bounding box 420$a$ may correspond to the driver 202, the bounding box 420$b$ to the passenger 410$a$ and the bounding box to the passenger 410$b$. The bounding boxes 422$a$-422$d$ may correspond to the respective body parts 412$a$-412$d$. The bounding box 422$a$ may correspond to the arm 412$a$ of the driver 202, the bounding box 422$b$ to the right arm 412$b$ of the passenger 410$a$, the bounding box 422$c$ to the left arm 412$c$ of the passenger 410$a$ and the bounding box 422$d$ to the knee 412$d$ of the passenger 410$b$. While only a few body parts are shown detected as an illustrative example, the computer vision operations may detect additional body parts. The computer vision operations may also detect sub-portions of the detected body parts. For example, eyes may be detected as a sub-portion of the detected face 420a, fingers may be detected as sub-portions of the detected arm 422a, shoulders may be detected as sub-portions of a body/torso, etc. The processors 106a-106n may track the body parts of each occupant together as a single body unit that represents a live human occupant. The number of body parts and/or the granularity of the detection of the body parts and/or faces of the occupants of the vehicle 50 may be varied according to the design criteria of a particular implementation.

The example video frame 400 may provide an example of the driver 202 in the interior 402 of the ego vehicle 50 with the additional passengers 410a-410b. Occupants (e.g., the driver 202 and the passengers 410a-410b) are shown in the seats 408b-408c. The passenger 410a is shown as a child sitting in the passenger seat 408b and the passenger 410b is shown as an adult sitting in the back seat 408c. The CNN module 150 may be configured to determine that there are multiple occupants in the vehicle 50. The CNN module 150 may be configured to determine the number of the occupants in the vehicle 50 in response to performing the computer vision operations.

The processors 106a-106n may be configured to distinguish which body parts correspond to each individual. Based on the movements of the body parts detected and the association of the body parts detected with the driver 202 and/or the passengers 410a-410b, the processors 106a-106n may determine how many people are in the interior 402 of the vehicle 50. The processors 106a-106n may use the detected faces 420a-420c to determine the number of occupants in the interior 402. However, the faces of each occupant may not always be visible in the video frame 400. In one example, a person may be lying down or bending down, which may prevent the face from being captured in the video frame 400. In another example, a young child may be in a baby seat, which may be facing away from the camera that captured the video frame 400. In yet another example, a child sitting in the rear seat 408c may not be tall enough and may be blocked by the front seats 408a-408b. The processors 106a-106n may further take into account other detected body parts 422a-422d and/or other hints/inferences that a person is in the vehicle 50 in order to determine the accurate number of occupants.

The processors 106a-106n may analyze the totality of the detected faces 420a-420c and/or the detected body parts 422a-422d to determine the number of occupants in the interior 402. The processors 106a-106n may be configured to perform depth analysis along with the analysis of the detected faces 420a-420c and/or the detected body parts 422a-422d in order to distinguish between people within the vehicle 50 and people (e.g., pedestrians) that may be visible through the windows 406a-406c. For example, pedestrians outside of the vehicle that have been captured through the windows 406a-406c may have a depth that is determined to be outside of the distance bounds of the interior 402. People visible through the windows 406a-406c may be ignored when determining the number of the occupants within the vehicle 50. The processors 106a-106n may be configured to assign each of the detected body parts 422a-422d with each of the occupants of the vehicle based on the orientation, movement and/or relationship between the various body parts. Assigning the detected body parts 422a-422d to a person may enable the processors 106a-106n to determine discrete people to count as an occupant.

In an example, the driver 202 and the passenger 410a may be mostly visible in the video frame 400 (e.g., body parts may not be obscured or appear disembodied with reference to the entire body). For example, the detected face 420a of the driver 202 may be shown connected to the body which may further be connected to the detected arm 422a. The processors 106a-106n may determine that the detected face 420a and the detected arm 422a may form a single body unit. Similarly, the detected face 420b and the detected arms 422b-422c of the passenger 410a may be shown connected to the same body. The processors 106a-106n may determine that the detected face 420b and the detected arms 422b-422c may form a single body unit that may be separate from the body unit of the driver 202.

In an example, the passenger 410b may be partially obscured by the seat 408b in the video frame 400. For example, there may not be complete continuity between various body parts and/or some body parts of the passenger 410b may appear disembodied. For example, the detected face 420c of the passenger 410b may be connected to the neck and body of the passenger 410b. However, the detected knee 422d may not be visibly connected to the body of the passenger 410b. The processors 106a-106n may determine that the detected face 420c and the detected knee 422d may form a single body unit based on various inferences. For example, the processors 106a-106n may be configured to determine that the detected knee 422d may be likely to be part of the single body unit of the passenger 410b based on an orientation of the detected knee 422d, a proximity of the detected knee 522d 422d to other body parts of the passenger 410b, depth measurements, common proportions of human bodies and/or a proximity of the detected knee 422d to other occupants in the vehicle 50.

The processors 106a-106n may be configured to detect inconsistencies in the arrangement of body parts of multiple occupants. In an example, the processors 106a-106n may determine whether body parts are in an impossible arrangement (e.g., two left arms are detected, which may indicate one person and another partially obscured person instead of a single person) to determine the number of occupants. For example, the detected knee 422d may have the shape and/or orientation of a left knee, which may correspond to the passenger 410b based on being on a left side of the passenger 410b. However, if the detected knee 422d was detected having the shape and/or orientation of a right knee, the processors 106a-106n may determine that a person may be obscured behind the seat 408a and the detected knee 422d may be a body part on the right side of the obscured passenger. In an example, an impossible body arrangement may be detecting an arm around the neck of the person 410b (e.g., may indicate that two people are cuddled up together, instead of one person). In yet another example, the number of body parts detected may correlate to the number of people (e.g., a total of six arms may indicate three occupants, but detecting a seventh disembodied arm may indicate that a fourth passenger is obscured).

The processors 106a-106n may analyze the video frame 400 and other temporally related video frames (e.g., a sequence of video frames captured before and after the video frame 400) to determine the movement and/or behavior of the occupants of the vehicle 50. In an example, a movement of the driver 202 and/or the passengers 410a-410b may provide additional information about the number of occupants in the vehicle 50. For example, in the video frame 400, the processors 106a-106n may not be able to determine that the detected knee 422d is part of the body unit of the passenger 410b with a high level of confidence. However, over a sequence of video frames, the passenger 410b may move the knee 412d, which may provide behavioral information that may increase a confidence level that the detected knee 422d is appropriately associated with the passenger 410b (e.g., more of the leg may become visible, which may indicate a visual connection of the detected knee 422d to the body of the passenger 410b).

While a few detected body parts are shown in the example video frame 400, the processors 106a-106n may detect additional body parts and determine the inter-relationship between the body parts. For example, in addition to detecting the detected knee 422d, the processors 106a-106n may detect the shoulders, chest and neck of the passenger 410b (e.g., body parts that are interconnected). When the detected knee 422d moves, the processors 106a-106n may also detect a coordinated movement of other body parts of the passenger 410b, which may confirm that the detected knee 422d is part of the body unit of the passenger 410b. For example, as the detected knee 422d moves to the right, the interconnected movement of the torso and/or an arm of the passenger 410b (e.g., rotation and/or extension) may indicate that the body part belongs to the passenger 410b.

A proximity to the seats 408a-408c may be used to determine the number of occupants and/or which of the body parts belong to which person. Generally, one occupant may be in one of the seats 408a-408c. A detected body part may be associated with a person based on a proximity to one of the seats 408a-408c.

The proximity to the seats 408a-408c, the interconnection between the detected body parts and the orientation of the body parts with respect to each occupant of the vehicle 50 may be used by the processors 106a-106n to form groups of body parts associated with each of the vehicle occupants and/or adjust a confidence level. The decision module 158 may weigh multiple factors to make a determination about the number of the occupants of the ego vehicle 50. The determination may be provided as the confidence level. For example, the two detected arms 422b-422c may increase a confidence level that an occupant is in the seat 408b. In another example, the disembodied appearance of the detected knee 422d may decrease a confidence level of a single occupant being in the rear. However, the shape and/or orientation of the detected knee 422d may increase a confidence level of a single occupant being in the rear.

In some embodiments, the apparatus 100 may implement multiple camera angles in order to aggregate video data to make the determination about the movements and/or behavior of the driver 202 and/or the passengers 410a-410b in order to determine the number of occupants. In one example, one camera (e.g., one of the capture devices 102a-102n) may provide a wide angle view of the interior (e.g., as shown in the example video frame 400) and another camera may provide a directed view of one of the passengers 410a-410b, the driver 202 and/or one of the seats 408a-408c. Capturing video frames from multiple angles may provide a richer data set for the computer vision operations. The processors 106a-106n may be configured to combine the information (e.g., the metadata) generated from the various angles to increase and/or decrease a confidence level about various objects that have been detected. In one example, the wide angle view shown in the video frame 400 may be obscured by the seats 408a-408b, which may make a determination of the number of occupants difficult. However, a view of the rear seat 408c may provide video data that may be used to determine a number of occupants in the rear. The number of camera angles captured may be varied according to the design criteria of a particular implementation.

In some embodiments, the apparatus 100 may implement a speaker and/or provide input to a speaker system of the vehicle 50. In an example, the speaker system may be an example of the actuator 116 and the input may be provided by the signal VCTRL. For example, if the computer vision operations are unable to determine whether a body part belongs to one person or indicates that there are two separate people (e.g., a low confidence level), the signal VCTRL may be generated to play audio that asks the occupants of the vehicle 50 to move. When the occupants move, the computer vision operations may have more data to analyze to accurately count the occupants. In some embodiments, the apparatus 100 may ask how many occupants are in the vehicle 50. The apparatus 100 may perform audio analysis to recognize a number stated in response. In another example, the computer vision operations may be configured to detect a number of fingers raised that the occupants use to indicate how many occupants are in the vehicle (e.g., detecting two fingers raised to mean that there are two occupants). In yet another example, the computer vision operations may be configured to detect mouth movements to determine what was said (e.g., perform lip reading based on video data alone and/or in combination with audio analysis).

In some embodiments, the apparatus 100 may assume a number of occupants inside the vehicle 50 may not change during a single driving trip. For example, the computer vision operations may increment a count of the occupants as an occupant enters and decrement the count of the occupants as an occupant leaves the vehicle 50. The decision module 158 may assume that while the doors of the vehicle 50 are closed, the number of occupants may not be reduced (e.g., if one occupant lies down and is no longer visible, the count of the occupants may not be decremented if the vehicle has not stopped or the doors have not opened).

The decision module 158 may determine the number of occupants in response to the computer vision operations. The number of occupants detected in the interior 402 may be presented as the signal CNT. In the example shown, computer vision may be used to determine the number of occupants. A similar analysis may be used to determine the number of occupants using the radar data. For example, the processors 106a-106n may interpret the radar data in order to determine where various occupants are in the vehicle and/or detect particular body parts of the occupants. The radar data may provide general shapes of the occupants that the decision module 158 may use the shapes of the occupants to determine the number of the occupants to present as the signal CNT.

Figure 9:
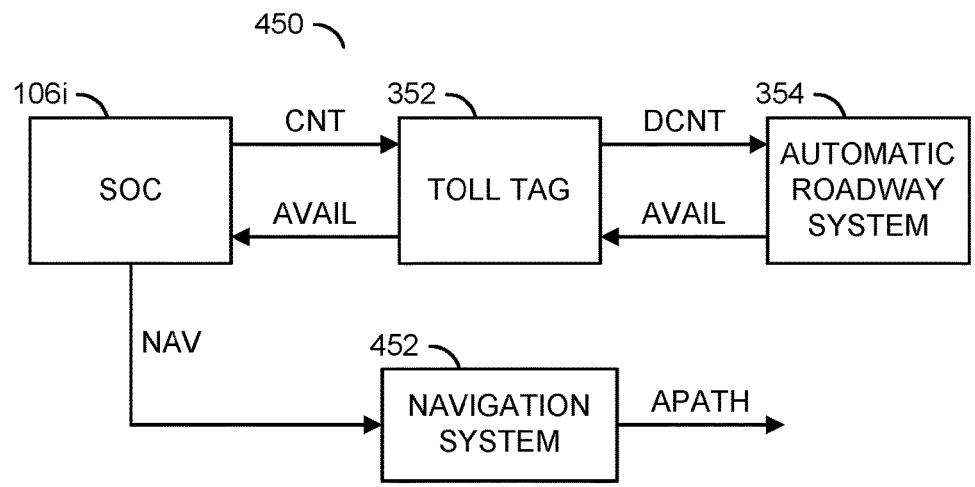
FIG. 9 is a block diagram illustrating adjusting a navigation road path in response to available road options based on a vehicle occupant count.

Referring to FIG. 9, a block diagram illustrating adjusting a navigation road path in response to available road options based on a vehicle occupant count is shown. A system 450 is shown. The system 450 may comprise the SoC 106i, the toll tag device 352, the automatic road system 354 and/or a block (or circuit) 452. The SoC 106i may be a representative example of one or more of the processors 106a-106n. The circuit 452 may implement a navigation system. The system 450 may comprise other components (not shown). The number, type and/or arrangement of the components of the system 450 may be varied according to the design criteria of a particular implementation.

The system 450 may be configured to determine a navigation road path in response to the number of occupants in the vehicle 50. The SoC 106i, the toll tag device 352 and the automatic roadway system 354 may have a similar implementation as described in association with FIG. 5. The SoC 106i may present the signal CNT to the toll tag device 352.

The toll tag device 352 may present a signal (e.g., DCNT) and receive a signal (e.g., AVAIL). The signal DCNT may be presented to the automatic roadway system 354. The signal AVAIL may be received from the automatic roadway system 354. The toll tag device 352 may forward the signal AVAIL to the SoC 106i.

The signal DCNT may comprise data that indicates the number of occupants in the vehicle 50. In an example, the SoC 106i may present the number of occupants in the signal CNT to the toll tag device 352 and the toll tag device 352 may present the number of occupants to the automatic roadway system 354 via the signal DCNT. In some embodiments, the toll tag device 352 may display a scannable code readable by the automatic roadway system 354. In some embodiments, the toll tag device 352 may implement a two way communication with the automatic roadway system 354 and present the signal DCNT. For example, the toll tag device 352 may implement a communication module configured to implement Wi-Fi communication, Bluetooth communication, ZigBee communication and/or another communication protocol. The communication module may enable the toll tag device 352 to send the signal DCNT to the automatic roadway system 354 and receive the signal AVAIL from the automatic roadway system 354.

In some embodiments, the automatic roadway system 354 may present the signal AVAIL to the toll tag device 352. In some embodiments, the communication devices 110 of the apparatus 100 may connect to the automatic roadway system 354 and the automatic roadway system 354 may present the signal AVAIL to the SoC 106i without communicating through the toll tag device 352. The signal AVAIL may comprise a list of eligible roads and/or lanes for the vehicle 50. The list of eligible roads/lanes may be determined by the automatic roadway system 354 based on the number of occupants in the vehicle 50. For example, the list of eligible roads/lanes may comprise high occupancy lanes that the vehicle 50 may use because the occupancy criteria for the high occupancy lane has been met. In another example, the list of eligible roads/lanes may comprise toll roads that have the fee waived due to meeting a passenger occupancy criteria for the road. In yet another example, the list of eligible roads/lanes may comprise toll roads that have a discounted fee due to a passenger occupancy criteria for the road. The types of roads/lanes that may be provided in the list of eligible roads/lanes may be varied according to the design criteria of a particular implementation.

The SoC 106i may generate a signal (e.g., NAV) in response to the signal AVAIL. The signal NAV may comprise the list of eligible roads/lanes provided in a format compatible with the navigation system 452. The SoC 106i may be configured to interface with the navigation device 452, which may be implemented by the vehicle 50 (e.g., the navigation device 452 may be implemented as part of an infotainment unit of the vehicle 50). In some embodiments, the SoC 106i may be configured to interface with the navigation device 452, which may be an aftermarket addition to the vehicle 50 (e.g., a GPS unit, a smartphone running a navigation app, a tablet computing device running a navigation app, etc.).

The navigation device 452 may be configured to determine a navigation path for the vehicle 50. The navigation path may comprise a planned route for the driver 202 to take to a selected destination. The navigation path may comprise a current location of the vehicle 50 (e.g., determined based on GPS/GNSS data), the selected destination and/or a map of the region. The navigation path may provide a selection of roads and/or lanes for the driver 202 to take to reach the selected destination. For example, the navigation path may determine a fastest route, a shortest route, a route with the least amount of traffic, a route that does not have toll roads, a route that excludes pre-defined locations, etc. The signal NAV may be presented to the navigation device 452. The navigation device 452 may be configured to adjust the navigational path for the vehicle 50 in response to the signal NAV. The signal NAV may provide the list of eligible roads/lanes. The navigation device 452 may re-calculate the navigation path based on the eligibility of multi-occupant vehicle lanes between the current location of the vehicle 50 and the selected destination of the vehicle 50.

In some embodiments, the signal NAV may provide the list of eligible roads/lanes received from the automatic roadway system 354. The navigation device 452 may be configured to analyze the list of eligible roads/lanes and determine if any of the eligible roads/lanes provide a faster/shorter/optimal route to reach the selected destination. If the list of eligible roads/lanes provides a road/lane that offers an improvement (e.g., less travel time, better fuel/battery economy, less traffic, etc.) over the current path, the navigation device 452 may re-adjust the path. In some embodiments, the navigation device 452 may comprise a setting that enables/disables the use of toll roads. The signal NAV may be configured to toggle the setting to enable toll roads for the eligible roads/lanes that waive a toll and/or reduce a fee based on the number of occupants in the vehicle 50. In some embodiments, the adjusted navigation path may provide alternate turns than the original path. For example, a high occupancy vehicle lane may offer a left hand turn, while the normal occupancy lanes may offer a right turn. The adjusted navigation path may provide the updated direction instructions to the driver 202.

The navigation system 452 may generate a signal (e.g., APATH) in response to the signal NAV. The signal APATH may comprise the adjusted navigation path. For example, the signal APATH may be presented to one of the displays 118a-118n that displays a visual of the map data and/or navigation path. In some embodiments, the signal APATH may be presented to an autonomous driving system of the vehicle 50. For example, the vehicle 50 may be configured for autonomous and/or semi-autonomous driving. The autonomous driving system may be configured to drive along the navigation path with little or no assistance from the driver 202. The signal APATH may provide the update for the navigation path that may be used by the autonomous driving system.

Figure 10:
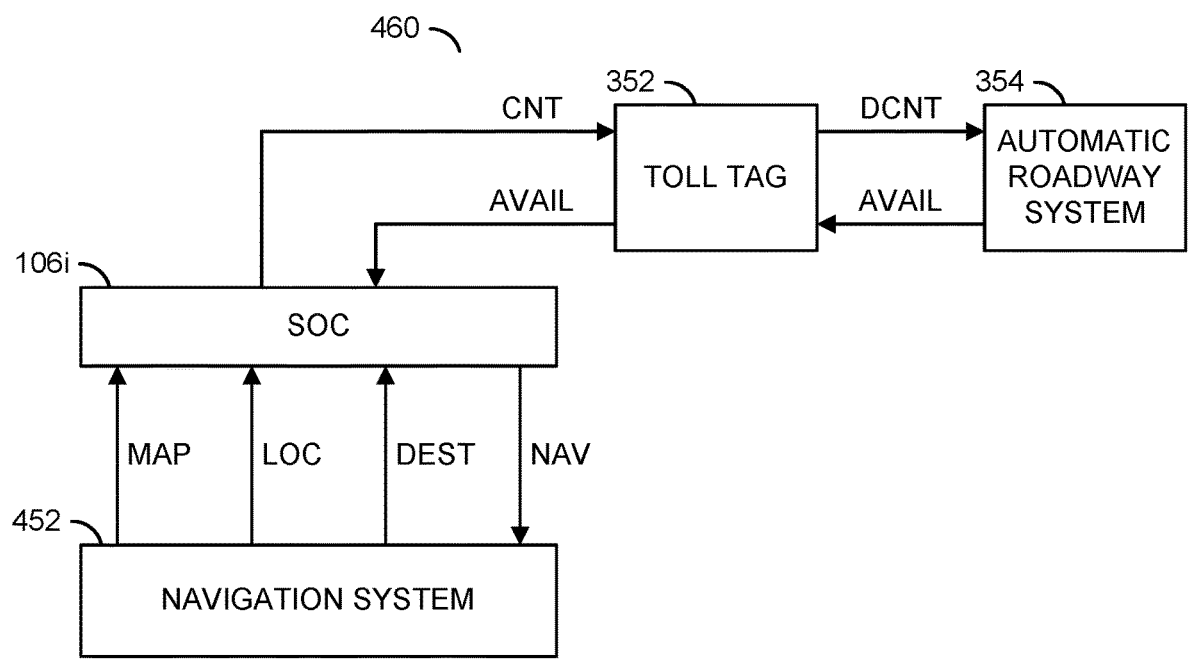
FIG. 10 is a block diagram illustrating determining a navigation road path for a navigation system in response to available road options based on a vehicle occupant count.

Referring to FIG. 10, a block diagram illustrating determining a navigation road path for a navigation system in response to available road options based on a vehicle occupant count is shown. A system 460 is shown. The system 460 may comprise an alternate embodiment of adjusting the navigation path. The system 460 may comprise the SoC 106i, the toll tag device 352, the automatic road system 354 and/or navigation system 452. The SoC 106i, the toll tag device 352 and the automatic roadway system 354 may interact similar to the functionality described in association with FIG. 9.

In the system 460, the processor 106i may be configured to determine the adjustment to the navigation path based on the number of occupants in the vehicle 50 and the list of eligible roads/lanes presented in the signal AVAIL. In an example, the navigation system 452 may have limited processing capabilities and/or may be unable to update the navigation path based on the number of occupants and/or may be unable to read the list of eligible roads/lanes. In one example, using the SoC 106i to update the navigation path may help preserve a limited battery availability of a smartphone implementing the navigation device 452.

The navigation system 452 may generate a signal (e.g., MAP), a signal (e.g., LOC) and/or a signal (e.g., DEST). The signal MAP may comprise map data of the region near the vehicle 50. The signal LOC may comprise a current location of the vehicle 50 (e.g., a GPS/GNSS location). The signal DEST may comprise the selected destination. The signal MAP, the signal LOC and the signal DEST may be presented to the SoC 106*i*.

The SoC 106*i* may receive the signal AVAIL comprising the list of available roads/lanes. The SoC 106*i* may compare the list of available roads/lanes with the map data in the signal MAP. Based on the current location provided in the signal LOC and the selected destination provided in the signal DEST, the SoC 106*i* may calculate an adjusted path. Calculating the adjusted path using the SoC 106*i* instead of using the navigation system 452 may provide greater flexibility. For example, the SoC 106*i* may be updatable and/or programmable, while the navigation system 452 may not have the ability to interpret the list of available roads/lanes. The SoC 106*i* may determine an eligibility of any multi-occupant lanes (or toll lanes with reduced/waived fees) available to the vehicle 50 based on the number of occupants between the current location and the selected location. The SoC 106*i* may determine the adjusted route from the current location to the selected destination based on the eligibility of the lanes/roads. The SoC 106*i* may calculate the adjusted navigation path. The adjusted navigation path may be presented to the navigation system 452 via the signal NAV. The signal NAV may be presented in a format readable by the navigation system 452 to provide instructions to the navigation system 452. In an example, the adjusted navigation path may comprise a number of waypoints between the current location and the destination to ensure that the navigation system 452 properly selects the multi-occupant lanes (or reduced/waived toll roads).

Figure 11:
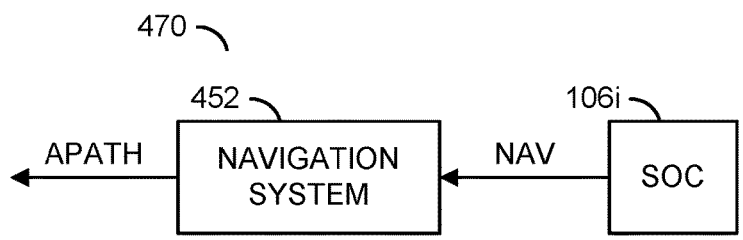
FIG. 11 is a block diagram illustrating determining an adjustment to a navigational road path.

Referring to FIG. 11, a block diagram illustrating determining an adjustment to a navigational road path is shown. A system 470 is shown. The system 470 may comprise an alternate embodiment of adjusting the navigation path. The system 470 may comprise the SoC 106*i* and/or navigation system 452. In the example shown, the SoC 106*i* and the navigation system 452 may be configured to adjust the navigation path without implementing the toll tag device 352.

The SoC 106*i* may be configured to operate similar to the SoC 106*i* described in association with FIGS. 9 and 10. The SOC 106*i* may be configured to receive the data about the vehicle interior 402 (e.g., video frames and/or radar data). The SoC 106*i* may be configured to process the data and determine the number of occupants in the vehicle 50 in response to analyzing the data. The SoC 106*i* may generate the signal NAV in response to the number of occupants in the vehicle 50. The signal NAV may be in a format compatible with the navigation system 452.

In some embodiments, the SoC 106*i* may communicate with the automatic roadway system 354 (not shown). For example, the SoC 106*i* may present the signal CNT to the automatic roadway system 354 and receive the signal AVAIL comprising the list of eligible roads/lanes and the signal NAV may be generated in response to the signal AVAIL. In some embodiments, the SoC 106*i* may generate the signal CNT, which may be presented to one or more components of the vehicle 50. For example, the signal CNT may be used by a heating/cooling system of the vehicle 50, by an infotainment system, by a vehicle safety system, etc. In one example, the signal CNT may be presented to a CAN bus of the vehicle 50. Whether or not the occupant count signal CNT is generated when the toll tag device 352 is not implemented and/or the use of the signal CNT may be varied according to the design criteria of a particular implementation.

The navigation system 452 may be configured to adjust the navigation path in response the signal NAV and an eligibility of using multi-occupant vehicle lanes in between the current location of the vehicle 50 and the destination of the vehicle 50. The eligibility of the multi-occupant lanes for the vehicle 50 may be determined in response to the number of occupants in the vehicle 50. The navigation system 452 may generate the signal APATH in response to the signal NAV (e.g., to provide instructions for an autonomous driving system of the vehicle 50).

In some embodiments, the navigation system 452 may be configured to determine the adjusted path (e.g., based on the map data, the current location of the vehicle 50, the destination of the vehicle 50 and eligibility of the high occupancy roads/lanes). In some embodiments, the navigation system 452 may present the map data, the current location of the vehicle 50 and the destination of the vehicle 50 to the SoC 106*i* and the SoC 106*i* may determine the adjusted path. For example, the signal NAV may comprise the adjusted path. In some embodiments, the signal NAV may comprise an input to the navigation system 452 that adjusts a setting. The setting adjusted may be a setting that toggles on/off whether the path selected by the navigation system 452 allows for the use of toll roads. The signal NAV may enable using the toll roads that have the fees waived based on meeting the vehicle occupancy threshold. The signal NAV may change the setting to enable the use of toll roads and the navigation system 452 may re-calculate the path to allow for the use of the toll roads and/or multi-occupant vehicle lanes.

Figure 12:
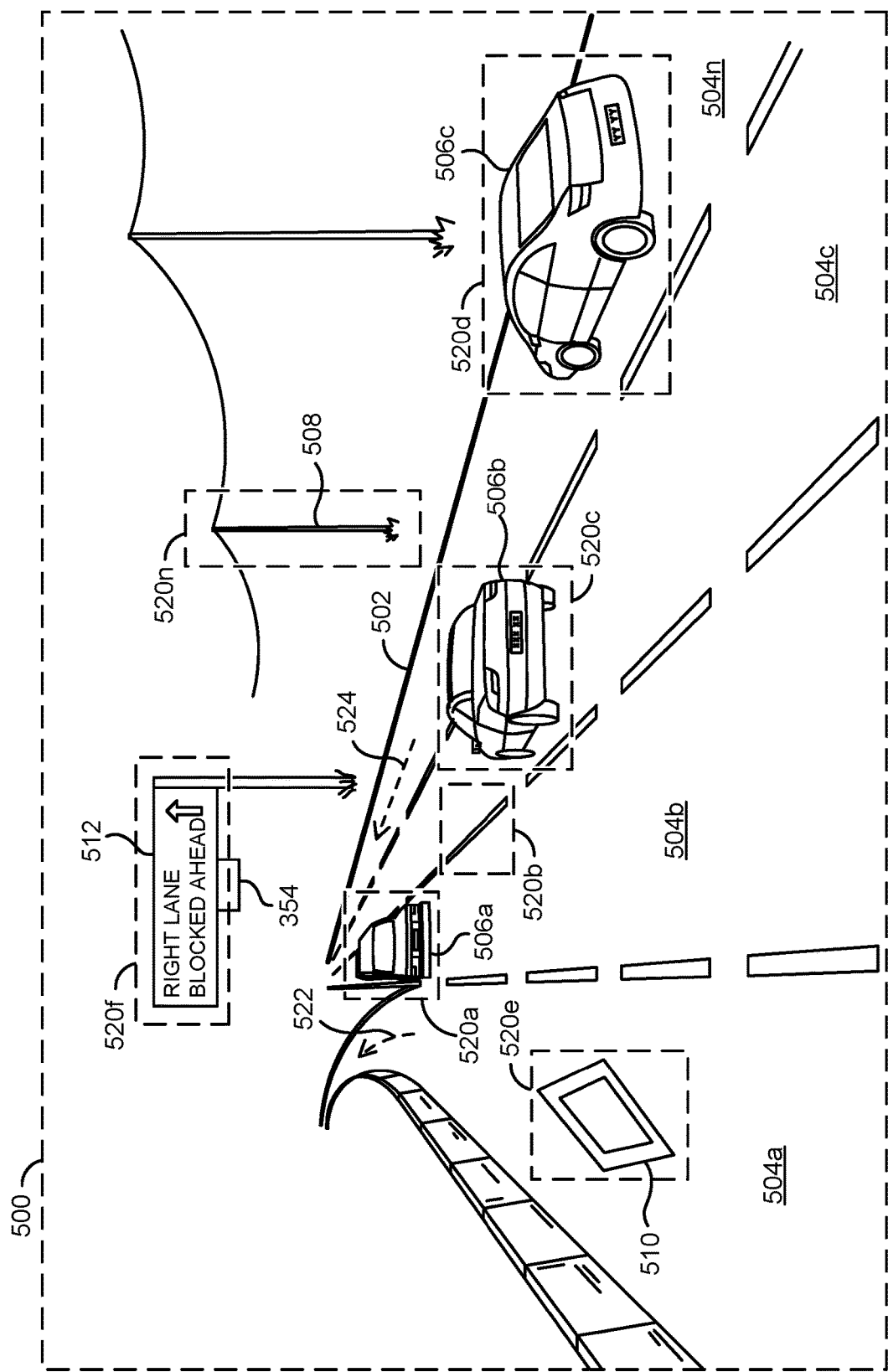
FIG. 12 is a diagram illustrating determining per-lane traffic and lane selection in response to computer vision operations and a vehicle occupant count.

Referring to FIG. 12, a diagram illustrating determining per-lane traffic and lane selection in response to computer vision operations and a vehicle occupant count is shown. An example video frame 500 is shown. The example video frame 500 may comprise pixel data captured on an environment near the vehicle 50. In the example shown, the video frame 500 may comprise a view from the perspective of the front of the vehicle 50. For example, the video frame 500 may comprise the pixel data (e.g., exterior pixel data) captured using the lens 112*e* as shown in association with FIG. 2. The external video frame 500 may be a wide angle view that captures a field of view comprising a lane that the vehicle 50 may be driving in and additional lanes.

The processors 106*a*-106*n* may be configured to perform the computer vision analysis on the external video frame 500. The video analysis performed on the external video frame 500 may be similar to the video analysis performed on the in-cabin video frame 400 as described in association with FIG. 8. The types of objects detected and/or the characteristics analyzed may be different for detecting the number of occupants in the vehicle 50 and per-lane traffic information exterior to the vehicle 50. In an example, the CNN module 150 may implement different detection libraries for detecting the number of occupants in the vehicle 50 than the libraries used for detecting objects on a roadway. The processors 106*a*-106*n* may be configured to process the exterior pixel data arranged as video frames. The processors 106*a*-106*n* may be configured to perform the computer vision operations on the external video frame 500 (and other video frames in a series of video frames) to determine per-lane traffic information.

The external video frame 500 may comprise a roadway 502. In the example shown, the roadway 502 may be a multi-lane highway. The roadway 502 may comprise a number of lanes 504a-504n. Other vehicles 506a-506c are shown on the roadway 502. In the example shown, the other vehicle 506a may be driving in the lane 504b, the other vehicle 506b may be driving in the lane 504c and the other vehicle 506c may be driving in the lane 504n. The vehicle 50 and the other vehicles 506a-506c may be driving in one-way traffic. An electrical pole 508 is shown beside the roadway 502. A symbol 510 is shown painted on the lane 504a. The symbol 510 may be a high-occupancy vehicle symbol. For example, the lane 504a may be a high occupancy vehicle lane and the lanes 504a-504n may be standard lanes. A sign 512 is shown hanging over the roadway 502.

The automatic roadway system 354 is shown attached to the sign 512. Attaching the automatic roadway system 354 to the sign 512 may enable the automatic roadway system 354 to be implemented in an overhead position with respect to the roadway 502. For example, the automatic roadway system 354 may scan and/or communicate with the toll tag device 352 as the vehicle 50 passes underneath the automatic roadway system 354 and the sign 512. In another example, the automatic roadway system 354 may be attached to the electrical pole 508. The overhead position of the automatic roadway system 354 may provide a vantage point for reading the toll tag device 352 but may not provide a vantage point that may see into the interior 402 of the vehicle 50 (e.g., to accurately count the number of occupants using a camera). While the automatic roadway system 354 is shown as a single device on the sign 512, the automatic roadway system 354 may comprise multiple devices (e.g., implemented at intervals along the roadway 502, implemented at an entrance of the roadway 502, implemented at an exit of the roadway 502, etc.). The placement of the devices that comprise the automatic roadway system 354 may be varied according to the design criteria of a particular implementation.

Bounding boxes 520a-520n are shown. The bounding boxes 520a-520n may correspond to the computer vision operations similar to the bounding boxes 420a-420c and/or 422a-422d described in association with FIG. 8. The bounding box 520a may indicate the detection of the vehicle 506a, the bounding box 520b may indicate the detection of a lane marker between the lanes 504b-504c, the bounding box 520c may indicate the detection of the vehicle 506b, the bounding box 520d may indicate the detection of the vehicle 506c, the bounding box 520e may indicate the detection of symbol 510, the bounding box 520f may indicate the detection of the sign 512 and the bounding box 520n may indicate the detection of the electrical pole 508. The bounding boxes 520a-520n may represent a sample of objects detected using the computer vision operations. The computer vision operations may detect more than the detected objects 520a-520n shown.

The computer vision operations may detect sub-portions of objects (e.g., a license plate of the vehicles 506a-506c, the text on the sign 512, objects within the vehicles 506a-506c, etc.). The computer vision operations may further determine characteristics about the detected objects (e.g., a current speed of the vehicles 506a-506c, an acceleration of the vehicles 506a-506c, a traffic density in each of the lanes 504a-504n, whether the lanes 504a-504n may be closing or turning off, a number of occupants in each of the vehicles 506a-506c, etc.). The number, type and/or granularity of the objects detected using the computer vision operations may be varied according to the design criteria of a particular implementation.

The computer vision operations performed by the processors 106a-106n may be used to determine per-lane traffic information. For example, the navigation system 452 may receive traffic information, but the traffic information may provide general travel times for each road (e.g., a road level traffic granularity but not a lane level traffic granularity). The per-lane traffic information may enable the driver 202 (or an autonomous driving system of the vehicle 50) to select a driving lane on the roadway 502 and/or determine a navigation path on a per-lane level (e.g., selecting lanes that have the least amount of traffic). In some embodiments, the signal VCTRL may be generated based on the per-lane traffic level to an infotainment system of the vehicle 50 to provide a recommended lane choice. For example, the decision module 158 may recommend one of the lanes 504a-504n to the driver 202 and enable the infotainment system to indicate the recommended lane.

The list of eligible roads/lanes determined in response to the number of occupants of the vehicle 50 may provide an enhancement to the lane-level recommendation. In the example shown, the lane 504b may be occupied by the detected object 520a, the lane 504c may be occupied by the detected object 520c, the lane 504n may be occupied by the detected object 520d and the OCR performed on the detected object 520f may indicate that the lane 504n may be ending. However, the computer vision operations may determine that the lane 504a may be unoccupied. The computer vision operations may detect that, based on the detected object 520e, the lane 504a may not be selected because the lane 504a is a high occupancy vehicle lane. Based on the number of occupants detected in the vehicle 50 by the apparatus 100, the list of eligible roads/lanes may indicate that the vehicle 50 is eligible to drive in the lane 504a (e.g., the number of occupants meets the occupancy criteria for the high occupancy lane). When the lane 504a is determined to be eligible to the vehicle 50, the lane-level recommendation may include the lane 504a as an option for recommendation. For example, the lane selection performed by the processors 106a-106n and/or the navigation system 452 may be determined in response to an amount of traffic detected in each of the lanes 504a-504n and an eligibility of the vehicle 50 to access the multi-occupant vehicle lane 504a based on the number of occupants detected in the vehicle 50. Similarly, the lane 504a may be selected based on the number of occupants in the vehicle 50 and meeting a toll road criteria for driving in the lane 504a. In an example, the driver 202 may select a toll threshold. If the toll for driving in the lane 504a meets the toll threshold (e.g., the toll is less than the maximum toll selected by the driver 202), then the lane 504a may be an option for a per-lane selection for navigation. The tolls for driving in the lane 504a may vary based on the number of occupants in the vehicle 50.

A dashed arrow 522 and a dashed arrow 524 are shown. The dashed arrow 522 may correspond to an adjusted path using the high occupancy vehicle lane 504a. The dashed arrow 524 may correspond to a regular path using the one of the regular lanes 504b-504n. For example, the regular path 524 may be a default path that the vehicle 50 may use when the occupancy criteria for using the high occupancy lane 504a is not met. The adjusted path 522 and the regular path 524 may be representative examples of notifications for a lane selection that may be generated by the processors 106a-106n. In one example, the external video frame 500 may be output to one of the displays 118a-118n (e.g., a display on the infotainment system) and one of the paths 522-524 may be overlaid on the video frame output to indicate a per-lane selection recommendation. In one example, the regular path 524 may be presented when the vehicle 50 does not meet the occupancy criteria for the high occupancy vehicle lane 504a. In another example, when the apparatus 100 determines that the number of occupants in the vehicle 50 enables the vehicle 50 to be eligible to use the high occupancy vehicle lane 504a, the adjusted path 522 may be presented. In the example shown, the default path 524 may comprise staying to the right and remaining on the roadway 502, while the adjusted path 522 may comprise turning off the roadway 502 to the left. In some scenarios, the high occupancy vehicle lanes may offer a bypass and/or an alternate route for navigation. The adjusted path 522 may comprise selecting and/or recommending different interchanges, which may affect the instructions provided by the navigation system 452. The adjusted path 522 determined by the processors 106a-106n may account for the potential for different navigation instructions.

In some embodiments, the processors 106a-106n may be configured to determine the number of occupants within the other vehicles 506a-506c. For example, the capture devices 102a-102n may be implemented on the vehicle 50 that may provide a vantage point to capture video data within the other vehicles 506a-506c (e.g., capture a sub-portion of the objects 520a-520n). The number of occupants within the other vehicles 506a-506c may be an example of the characteristics the processors 106a-106n may determine about the objects 520a-520n. The apparatus 100 may communicate the number of occupants within each of the other vehicles 506a-506c to the automatic roadway system 354. In one example, the number of occupants in the other vehicles 506a-506c may provide another data point for the automatic roadway system 354 (e.g., provide a double-check of the number of occupants reported by a toll tag device implemented by each of the other vehicles 506a-506c). In another example, the number of occupants in the other vehicles 506a-506c may enable an automatic toll collection for vehicles that do not implement the toll tag device. In some embodiments, the driver 202 may receive compensation for reporting the number of occupants in the other vehicles 506a-506c (e.g., toll fees may be waived and/or discounted for providing the extra data to the automatic roadway system 354).

Figure 13:
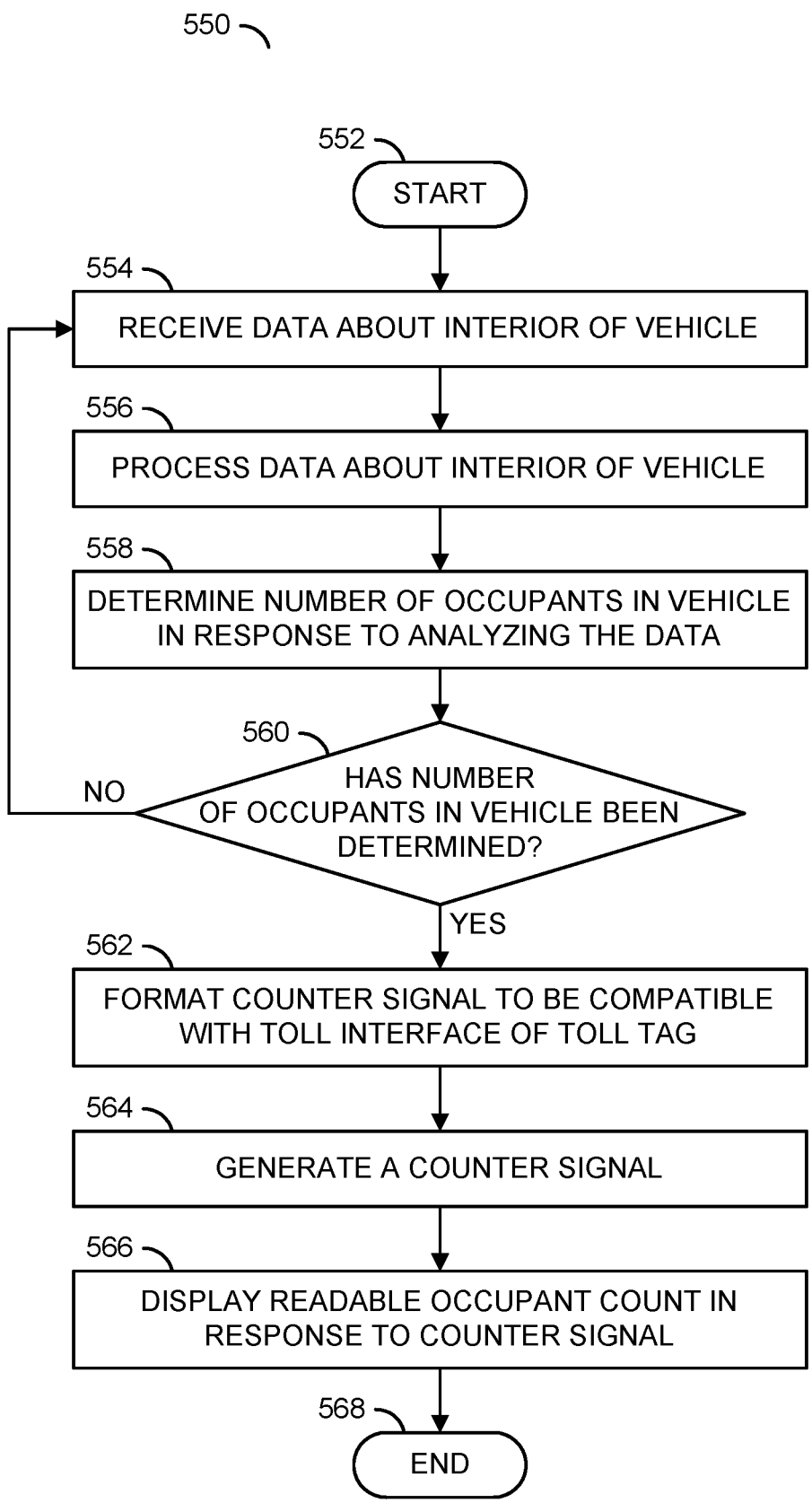
FIG. 13 is a flow diagram illustrating a method for toll collection and carpool lane automation.

Referring to FIG. 13, a method (or process) 550 is shown. The method 550 may automate toll collection and carpool lane usage for vehicles. The method 550 generally comprises a step (or state) 552, a step (or state) 554, a step (or state) 556, a step (or state) 558, a decision step (or state) 560, a step (or state) 562, a step (or state) 564, a step (or state) 566, and a step (or state) 568.

The step 552 may start the method 550. In the step 554, the processors 106a-106n may receive data about the interior 402 of the vehicle 50. In an example, the data may comprise pixel data arranged as video frames and/or radar data. Next, in the step 556, the processor 106a-106n may process the data about the interior 402 of the vehicle 50. In the step 558, the processors 106a-106n may determine the number of occupants within the vehicle 50 in response to analyzing the data. Next, the method 550 may move to the decision step 560.

In the decision step 560, the processors 106a-106n may determine whether the number of occupants in the vehicle 50 has been determined. In an example, the processors 106a-106n may distinguish between various body parts and/or body units of the occupants, determine liveness of potential occupants, associate each occupant with a seat, determine a confidence level of the accuracy of the detection, etc. If the number of occupants has not been detected with sufficient accuracy, the method 550 may return to the step 554 (e.g., receive more data until sufficient confidence is attained). If the number of occupants has been determined, then the method 550 may move to the step 562.

In the step 562, the processors 106a-106n may format the occupancy count data in a format compatible with the passenger counter interface 360. Next, in the step 564, the processors 106a-106n may generate the counter signal CNT. In an example the counter signal CNT may be an example of the signal VCTRL generated by the interface 104. In the step 566, the toll tag device 352 may display a readable occupant count on the count output device 362. The count output device 362 may be read by the automatic roadway system 354. Next, the method 550 may move to the step 568. The step 568 may end the method 550.

Figure 14:
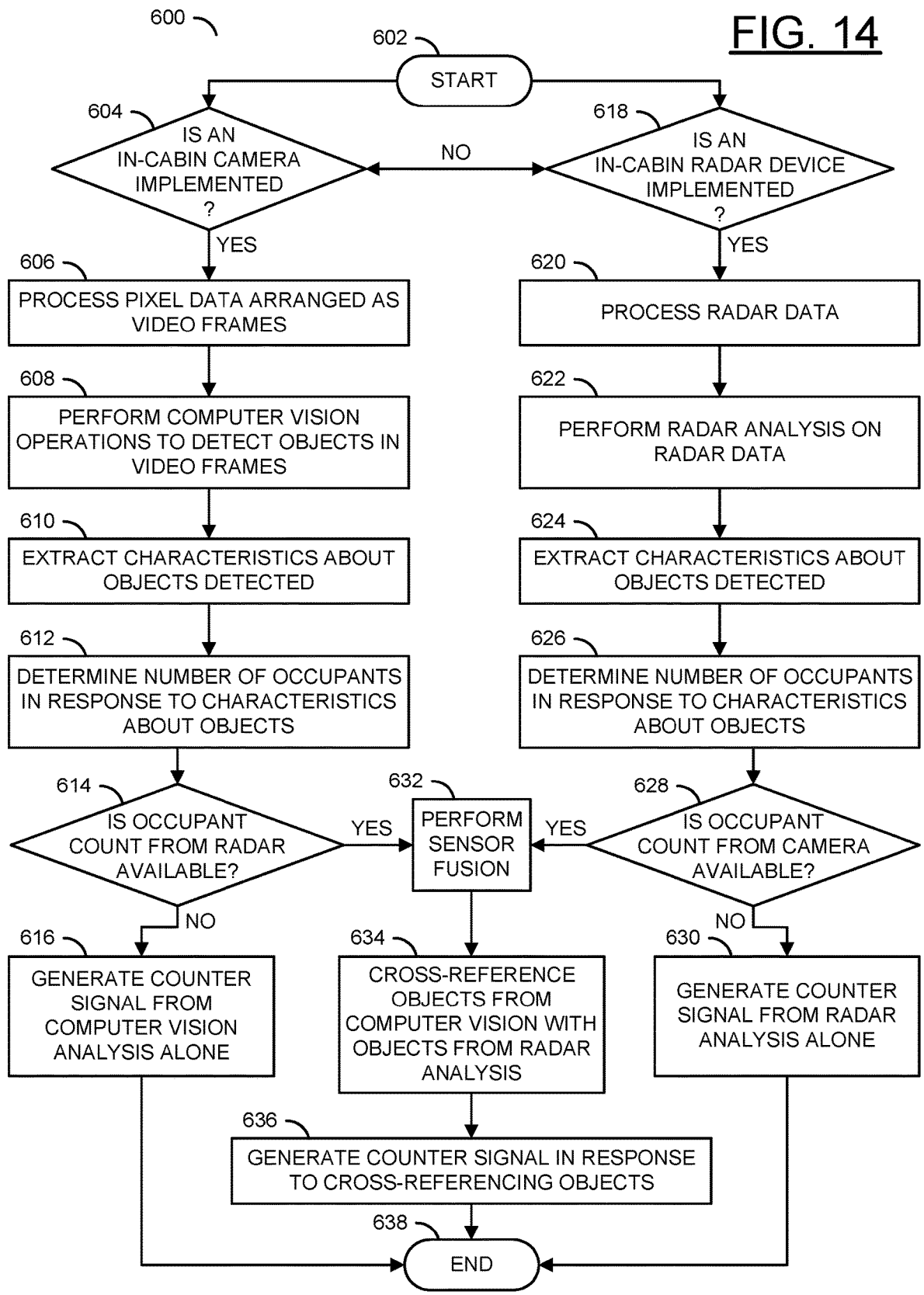
FIG. 14 is a flow diagram illustrating a method for determining a number of occupants in a vehicle using computer vision and/or radar.

Referring to FIG. 14, a method (or process) 600 is shown. The method 600 may determine a number of occupants in a vehicle using computer vision and/or radar. The method 600 generally comprises a step (or state) 602, a decision step (or state) 604, a step (or state) 606, a step (or state) 608, a step (or state) 610, a step (or state) 612, a decision step (or state) 614, a step (or state) 616, a decision step (or state) 618, a step (or state) 620, a step (or state) 622, a step (or state) 624, a step (or state) 626, a decision step (or state) 628, a step (or state) 630, a step (or state) 632, a step (or state) 634, a step (or state) 636, and a step (or state) 638.

The step 602 may start the method 600. Next, the method 600 may move to the decision step 604 and the decision step 618. In an example, the steps 604-616 may be performed and/or executed in parallel or substantially in parallel with the steps 618-630.

In the decision step 604, the processors 106a-106n may determine whether an in-cabin camera is implemented. In an example, the apparatus 100 may comprise one or more of the capture devices 102a-102n. In another example, the processors 106a-106n may receive the pixel data in at least one of the signals FRAMES_A-FRAMES_N if an in-cabin camera is implemented. If an in-cabin camera is not implemented, then the method 600 may move to the decision step 618 (e.g., perform occupancy detection using only radar data). If the in-cabin camera provides pixel data, then the method 600 may move to the step 606. In the step 606, the processors 106a-106n may process the pixel data arranged as video frames. For example, the pixel data may be operated on in the video processing pipeline 156. Next, in the step 608, the CNN module 150 may perform the computer vision operations to detect the objects in the video frames. In the step 610, the CNN module 150 may extract characteristics about the objects detected. For example, the processors 106a-106n may extract information about the detected faces 420a-420c and/or the detected body parts 422a-422d from the video frame 400. Next, in the step 612, the decision module 158 may determine the number of occupants in the interior 402 in response to the characteristics about the objects detected. Next, the method 600 may move to the decision step 614.

In the decision step 614, the processors 106a-106n may determine whether occupant count data is available from the radar device 114. In an example, the processors 106a-106n may determine whether a disparate source of occupant data has been provided by the radar device 114 in the steps 618-626. If the disparate source of data is available, then the method 600 may move to the step 632. If the disparate source of data is not available, then the method 600 may move to the step 616. In the step 616, the processors 106a-106n may generate the counter signal CNT based on the analysis performed by the computer vision operations alone. Next, the method 600 may move to the step 638.

In the decision step 618, the processors 106a-106n may determine whether an in-cabin radar device is implemented.

In an example, the apparatus 100 may comprise one or more of the radar devices as part of the sensor suite 114. In another example, the processors 106a-106n may receive the radar data in the signal RDATA if the radar device 114 is implemented. If an in-cabin radar device 114 is not implemented, then the method 600 may move to the decision step 604 (e.g., perform occupancy detection using only computer vision data). If the in-cabin radar provides the radar data RDATA, then the method 600 may move to the step 620. In the step 620, the processors 106a-106n may process the radar data. Next, in the step 622, the processors 106a-106n may perform the radar analysis on the radar data. In the step 624, the processors 106a-106n may extract characteristics about the objects detected in the radar data. For example, the processors 106a-106n may extract information about body shapes, depth data and/or liveness in response to the characteristics about the objects detected. Next, in the step 626, the decision module 158 may determine the number of occupants in the interior 402 in response to the characteristics about the objects detected. Next, the method 600 may move to the decision step 628.

In the decision step 628, the processors 106a-106n may determine whether occupant count data is available from the computer vision operations. In an example, the processors 106a-106n may determine whether a disparate source of occupant data has been provided by the video processing pipeline 156 in the steps 604-612. If the disparate source of data is available, then the method 600 may move to the step 632. If the disparate source of data is not available then the method 600 may move to the step 630. In the step 630, the processors 106a-106n may generate the counter signal CNT based on the analysis performed by the radar analysis alone. Next, the method 600 may move to the step 638.

In the step 632, the sensor fusion module 152 may perform sensor fusion on the two disparate sources of data (e.g., the computer vision results and the radar analysis). Next, in the step 634, the sensor fusion module 152 may cross-reference the objects detected using the computer vision operations with the objects detected using the radar analysis. For example, the sensor fusion module 152 may aggregate and weight results from both sources of data based on the confidence level of the results (e.g., a higher confidence level may be given a higher weighting). In the step 636, the processors 106a-106n may generate the counter signal CNT in response to cross-referencing the objects detected from the multiple sources of data. Next, the method 600 may move to the step 638. The step 638 may end the method 600.

Figure 15:
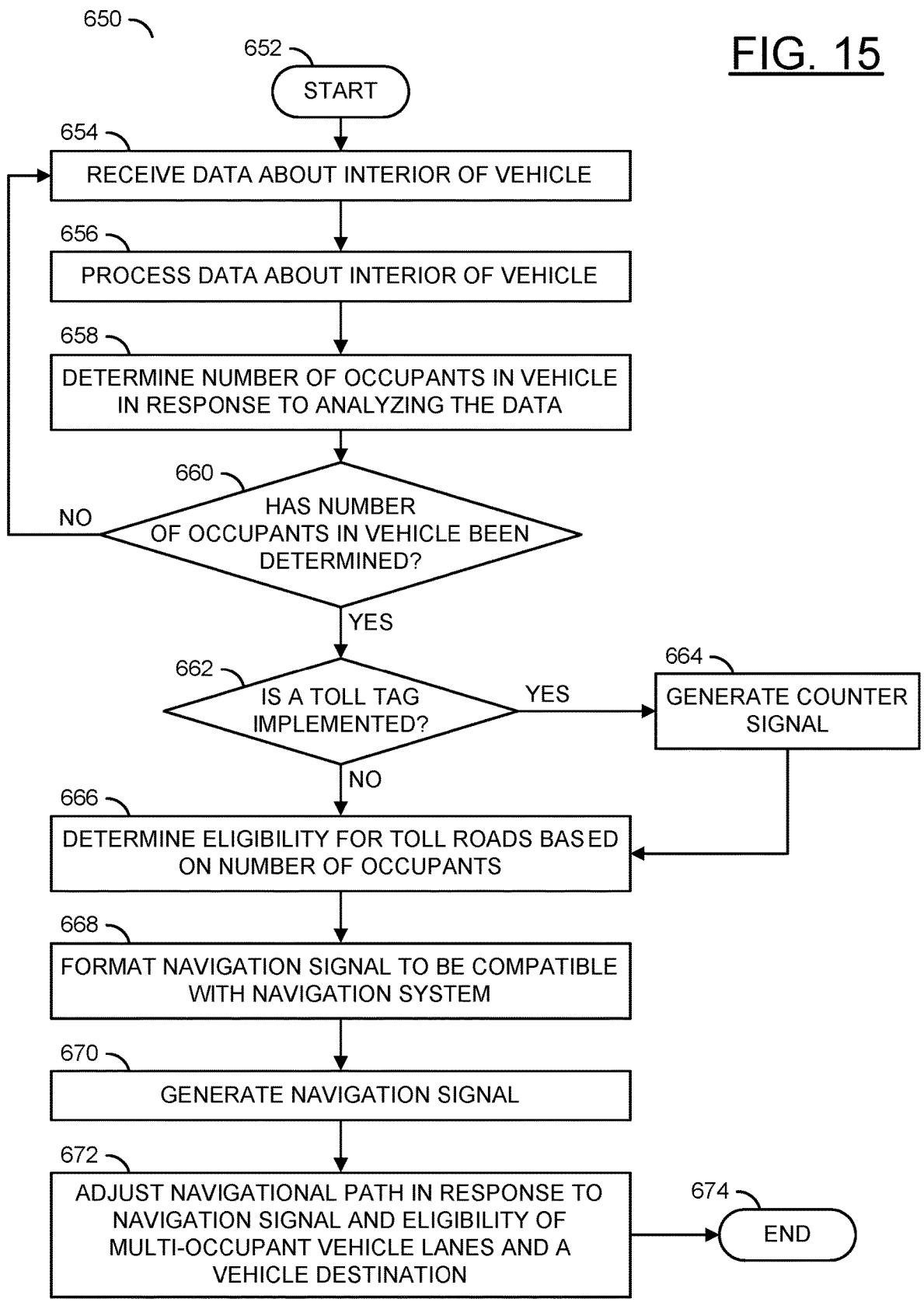
FIG. 15 is a flow diagram illustrating a method for adjusting a navigational path in response to toll road eligibility based on vehicle occupancy.

Referring to FIG. 15, a method (or process) 650 is shown. The method 650 may adjust a navigational path in response to toll road eligibility based on vehicle occupancy. The method 650 generally comprises a step (or state) 652, a step (or state) 654, a step (or state) 656, a step (or state) 658, a decision step (or state) 660, a decision step (or state) 662, a step (or state) 664, a step (or state) 666, a step (or state) 668, a step (or state) 670, a step (or state) 672, and a step (or state) 674.

The step 652 may start the method 650. In the step 654, the processors 106a-106n may receive data about the interior 402 of the vehicle 50. For example, the computer vision operations and/or the radar analysis may be performed. Next, in the step 656, the processors 106a-106n may process the data about the interior 402 of the vehicle 50. In the step 658, the processors 106a-106n may determine the number of occupants in the vehicle 50 in response to analyzing the data. Next, the method 650 may move to the decision step 660.

In the decision step 660, the processors 106a-106n may determine whether the number of occupants in the vehicle 50 has been determined. If the number of occupants has not been determined with sufficient confidence, then the method 650 may return to the step 654. If the number of occupants has been determined, then the method 650 may move to the decision step 662. In the decision step 662, the processors 106a-106n may determine whether the toll tag device 352 has been implemented. For example, the apparatus 100 may establish a communication link with the toll tag device 352 (e.g., over the OBD-II port, via a USB connection) and/or a wireless communication link. If the toll tag device 352 has been implemented, then the method 650 may move to the step 664. In the step 664, the processors 106a-106n may generate the counter signal CNT. Next, the method 650 may move to the step 666. In the decision step 662, if the toll tag device 352 is not detected, then the method 650 may move to the step 666.

In the step 666, the processors 106a-106n may determine the eligibility for toll roads based on the number of occupants detected in the vehicle 50. In an example, the toll tag device 352 and/or the apparatus 100 may communicate with the automated roadway system 354 to receive a list of eligible roads/lanes based on the number of occupants. In another example, the navigation system 452 may comprise toll data and/or high occupancy lane information in the map data. Next, in the step 668, the processors 106a-106n may format the navigation signal NAV in a format compatible with the navigation system 452. Next, the method 650 may move to the step 670.

In the step 670, the processors 106a-106n may generate the navigation signal NAV. In an example, the navigation signal NAV may be an example of the signal VCTRL generated by the interface 104. Next, in the step 672, the navigation system 452 may adjust the navigational path in response to the navigation signal NAV, the eligibility of multi-occupant vehicle lanes and the vehicle destination. Next, the method 650 may move to the step 674. The step 674 may end the method 650.

Figure 16:
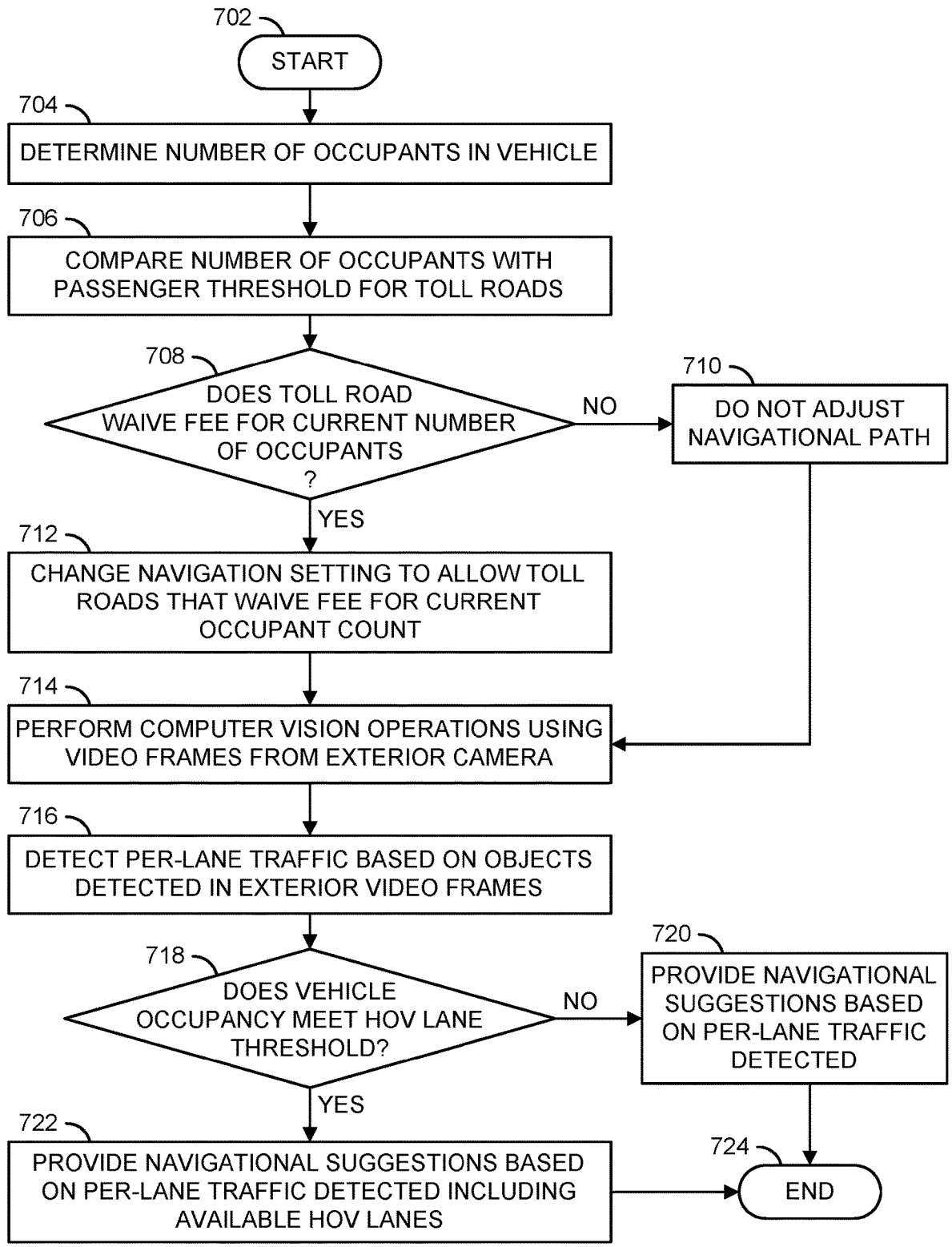
FIG. 16 is a flow diagram illustrating a method for adjusting a setting of a navigational system in response to vehicle occupancy.

Referring to FIG. 16, a method (or process) 700 is shown. The method 700 may adjust a setting of a navigational system in response to vehicle occupancy. The method 700 generally comprises a step (or state) 702, a step (or state) 704, a step (or state) 706, a decision step (or state) 708, a step (or state) 710, a step (or state) 712, a step (or state) 714, a step (or state) 716, a decision step (or state) 718, a step (or state) 720, a step (or state) 722, and a step (or state) 724.

The step 702 may start the method 700. In the step 704, the processors 106a-106n may determine the number of occupants in the vehicle 50. Next, in the step 706, the processors 106a-106n may compare the number of occupants in the vehicle 50 with the passenger threshold for toll roads in the region. In an example, the passenger threshold may be provided by the automated roadway system 354 via the signal AVAIL. In another example, the passenger threshold may be provided by the map data of the navigation system 452. Next, the method 700 may move to the decision step 708.

In the decision step 708, the processors 106a-106n may determine whether the toll road(s) waive a fee for vehicles with the current number of occupants. If the toll road does not waive a fee, then the method 700 may move to the step 710. In the step 710, the processors 106a-106n may not enable adjusting the navigational path. Next, the method 700 may move to the step 714. In the decision step 708, if the toll road does waive the fee, then the method 700 may move to the step 712. In the step 712, the processors 106a-106n may format the navigation signal NAV to enable a setting of the navigation system 452 to allow selecting roads that waive the fee for the current occupant count. Next, the method 700 may move to the step 714.

In the step 714, the processors 106a-106n may perform the computer vision operations on the pixel data arranged as video frames received from the capture devices 102a-102n that capture an exterior view from the vehicle 50 (e.g., the camera system 102e, the camera system 102c, etc.). Next, in the step 716, the processors 106a-106n may detect per-lane traffic in the lanes 504a-504n in response to the objects detected in the video frames. Next, the method 700 may move to the decision step 718.

In the decision step 718, the processors 106a-106n may determine whether the vehicle occupancy meets the multi-vehicle lane threshold. For example, the processors 106a-106n may determine whether the vehicle 50 is eligible to use the HOV lane 504a. If the vehicle 50 is not eligible, then the method 700 may move to the step 720. In the step 720, the navigation system 452 may provide navigational suggestions (e.g., lane selection advice) based on the per-lane traffic detected. Next, the method 700 may move to the step 724. In the decision step 718, if the vehicle 50 is eligible for the HOV lane 504a, then the method 700 may move to the step 722. In the step 722, the navigation system 452 may provide navigational suggestions based on the per-lane traffic and include the availability of the HOV lane(s). Next, the method 700 may move to the step 724. The step 724 may end the method 700.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive (i) data about an interior of a vehicle and (ii) exterior pixel data from a camera configured to capture an area exterior to said vehicle; and
   a processor configured to (i) process said data, (ii) determine a number of occupants in said vehicle in response to an analysis of said data, (iii) generate a counter signal comprising said number of said occupants in said vehicle, (iv) process said exterior pixel data arranged as video frames, (v) perform computer vision operations on said video frames to determine per-lane traffic information, and (vi) generate a notification comprising a lane selection for said vehicle based on (a) an amount of traffic in available lanes determined from said per-lane traffic information and (b) an eligibility of accessing a multi-occupant vehicle lane based on said number of said occupants, wherein
  (a) said counter signal is generated in a format compatible with a toll interface of a toll tag,
  (b) said toll tag is (i) implemented in said vehicle and (ii) configured to generate a readable occupant count in response to said counter signal, and
  (c) said readable occupant count is configured to be scanned by an automatic roadway system.

2. The apparatus according to claim 1, wherein said automatic roadway system is configured to determine whether said number of said occupants of said vehicle is sufficient for a carpool lane.

3. The apparatus according to claim 1, wherein said automatic roadway system is configured to determine a toll amount in response to said number of said occupants of said vehicle.

4. The apparatus according to claim 1, wherein (i) said data about said interior of said vehicle comprises pixel data and (ii) said processor is further configured to (a) process said pixel data arranged as video frames, (b) perform computer vision operations to detect objects in said video frames, (c) extract characteristics about said objects detected and (d) determine said number of said occupants in said vehicle in response to an analysis of said characteristics about said objects detected.

5. The apparatus according to claim 4, wherein said pixel data is received from an in-cabin camera of said vehicle.

6. The apparatus according to claim 5, wherein said in-cabin camera comprises an integrated interface configured to present said counter signal to said toll tag.

7. The apparatus according to claim 6, wherein said integrated interface is configured to communicate said counter signal to said toll tag using an OBD-II port of said vehicle.

8. The apparatus according to claim 6, wherein said integrated interface is configured to communicate said counter signal to said toll tag wirelessly using Bluetooth communication.

9. The apparatus according to claim 5, wherein said toll tag is implemented on a housing of said in-cabin camera.

10. The apparatus according to claim 1, wherein (i) said data about said interior of said vehicle comprises radar data and (ii) said processor is further configured to (a) process said radar data, (b) perform radar analysis to detect objects in said radar data, (c) extract characteristics about said objects detected and (d) determine said number of said occupants in said vehicle in response to an analysis of said characteristics about said objects detected.

11. The apparatus according to claim 10, wherein said radar data is generated by a 60 GHz radar device.

12. The apparatus according to claim 1, wherein (i) said data comprises pixel data and radar data and (ii) said processor is further configured to (a) perform computer vision operations on said pixel data arranged as video frames and process said radar data in parallel, (b) detect first objects in response to said computer vision operations and detect second objects in said radar data, (c) cross-reference said first objects and said second objects and (d) determine said number of said occupants in said vehicle in response to cross-referencing said first objects and said second objects.

13. The apparatus according to claim 1, wherein (i) said processor is further configured to generate a navigation signal in response to said number of said occupants, (ii) said navigational signal is presented to a navigation device implemented by said vehicle and (iii) said navigation device is configured to adjust a navigational path of said vehicle in response to (a) said navigation signal and (b) an eligibility of multi-occupant vehicle lanes between a current location of said vehicle and a destination of said vehicle.

14. The apparatus according to claim 1, wherein said processor is further configured to (i) receive (a) map data, (b) a current location of said vehicle and (c) a destination of said vehicle from a navigation device, (ii) determine an eligibility of multi-occupant vehicle lanes between said current location and said destination in response to said number of said occupants, (iii) determine an adjusted route to said destination based on said eligibility of said multi-occupant vehicle lanes and (iv) present a navigation signal comprising instructions for said adjusted route to said navigation device.

15. The apparatus according to claim 1, wherein (i) said processor is further configured to generate a navigation signal to a navigation device and (ii) said navigation signal is compatible with said navigation device to adjust a navigation setting of said navigation device that enables selecting a path with toll roads that waive fees based on meeting a threshold of said number of said occupants.

16. The apparatus according to claim 1, wherein (i) said vehicle comprises an autonomous driving system, (ii) said processor is further configured to provide a navigational signal to said autonomous driving system, (iii) said navigational signal comprises said number of said occupants and (iv) said autonomous driving system is configured to enable driving in a multi-occupant driving lane based on said number of said occupants.

17. An apparatus comprising:
  an interface configured to receive data about an interior of a vehicle and (ii) exterior pixel data from a camera installed on said vehicle configured to capture an area exterior to said vehicle; and
  a processor configured to (i) process said data, (ii) determine a number of occupants in said vehicle in response to an analysis of said data, (iii) process said exterior pixel data arranged as video frames, (iv) perform computer vision operations on said video frames to determine per-lane traffic information, (v) determine a lane selection for said vehicle in response to (a) an amount of traffic in available lanes determined from said per-lane traffic information and (b) an eligibility of accessing a multi-occupant vehicle lane based on said number of said occupants and (vi) generate a navigational signal in response to said lane selection, wherein
    (a) said navigational signal is generated in a format compatible with a navigation device,
    (b) said navigation device is configured to adjust a navigational path of said vehicle in response to (i) said navigation signal and (ii) said eligibility of multi-occupant vehicle lanes between a current location of said vehicle and a destination of said vehicle, and
    (c) said eligibility of said multi-occupant vehicle lanes for said vehicle is determined in response to said number of occupants in said vehicle.

18. The apparatus according to claim 17, wherein said navigation signal is compatible with said navigation device to adjust a navigation setting of said navigation device that enables selecting a path with toll roads that waive fees based on meeting a threshold of said number of said occupants.

19. The apparatus according to claim 17, wherein said processor is further configured to (i) receive (a) map data, (b) said current location of said vehicle and (c) said destination of said vehicle from said navigation device, (ii) determine said eligibility of multi-occupant vehicle lanes between said current location and said destination in response to said number of said occupants, (iii) determine an adjusted route to said destination based on said eligibility of said multi-occupant vehicle lanes and (iv) present said navigation signal comprising instructions for said adjusted route to said navigation device.

20. An apparatus comprising:
an interface configured to receive (i) data about an interior of a vehicle and (ii) exterior data from sensors configured to capture an area exterior to said vehicle; and
a processor configured to (i) process said data, (ii) determine a number of occupants in said vehicle in response to an analysis of said data, and (iii) generate a counter signal comprising said number of said occupants in said vehicle, (iv) 8 process said exterior data, (v) determine per-lane traffic information based on said exterior data, and (vi) generate a notification comprising a lane selection for said vehicle based on (a) an amount of traffic in available lanes determined from said per-lane traffic information and (b) an eligibility of accessing a multi-occupant vehicle lane based on said number of said occupants, wherein (a) said counter signal is generated in a format compatible with a toll interface of a toll tag, (b) said toll tag is (i) implemented in said vehicle and (ii) configured to generate a readable occupant count in response to said counter signal, and (c) said readable occupant count is configured to be scanned by an automatic roadway system.

* * * * *